(12) United States Patent
Mukojima

(10) Patent No.: US 6,445,720 B1
(45) Date of Patent: Sep. 3, 2002

(54) OPTICAL OUTPUT LEVEL CONTROL DEVICE FOR AN OPTICAL WAVELENGTH MULTIPLEXER INCLUDED IN AN OPTICAL TRANSMISSION SYSTEM

(75) Inventor: Toshiaki Mukojima, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/267,386

(22) Filed: Mar. 15, 1999

(30) Foreign Application Priority Data

Mar. 18, 1998 (JP) .......................................... 10-068651

(51) Int. Cl.$^7$ ................................................ H04J 3/04
(52) U.S. Cl. ...................................... 370/535; 359/115
(58) Field of Search ................................ 370/535, 532, 370/533, 534, 536, 537, 538, 539, 540, 541, 542, 401, 465; 359/115, 128, 124, 114

(56) References Cited

U.S. PATENT DOCUMENTS

| | | | | |
|---|---|---|---|---|
| 4,989,199 A | * | 1/1991 | Rzeszewski | 359/123 |
| 5,786,917 A | * | 7/1998 | Maeno | 359/128 |
| 5,812,289 A | * | 9/1998 | Tomooka et al. | 359/115 |
| 5,896,213 A | * | 4/1999 | Nagahori et al. | 359/137 |
| 6,198,721 B1 | * | 3/2001 | Mueller | 370/223 |

\* cited by examiner

Primary Examiner—Dang Ton
Assistant Examiner—Brian Nguyen
(74) Attorney, Agent, or Firm—Venable; Michael A. Sartori

(57) ABSTRACT

In an optical transmission system, an optical output control device for an optical wavelength multiplexer includes a wavelength generation circuit for generating wavelength data representative of a wavelength $\lambda_1$ or $\lambda_2$ and implemented by a decimal number or a binary number. A wavelength administrative byte generation circuit receives the $\lambda_1$ or $\lambda_2$ wavelength data and transfers it to a wavelength administrative byte insertion circuit and a wavelength administrative byte detection circuit. The wavelength administrative byte insertion circuit inserts the $\lambda_1$ or $\lambda_2$ wavelength data in the positions of bytes D1 and D2 of a high-speed signal, transforms the resulting multiplex signal to a corresponding optical signal, and delivers the optical signal to an optical multiplexing circuit. The multiplexing circuit multiplexes high-speed optical signals respectively having the wavelengths $\lambda_1$ and $\lambda_2$ and feeds the resulting multiplex high-speed optical signal to an optical amplifier. On the other hand, the wavelength administrative byte detecting circuit detects the data $\lambda_1$ and data $\lambda_2$ and sends them to a wavelength counting circuit. The wavelength counting circuit counts the different wavelengths and feeds its count to a light source control circuit. The light source control circuit generates a control signal based on the count and feeds it to an exciting light source. The exciting light source applies to the optical amplifier an exciting optical signal whose intensity is determined by the control signal. The amplifier combines the high-speed optical signal and exciting optical signal and then amplifies signal light contained in the combined signal to a preselected level.

18 Claims, 24 Drawing Sheets

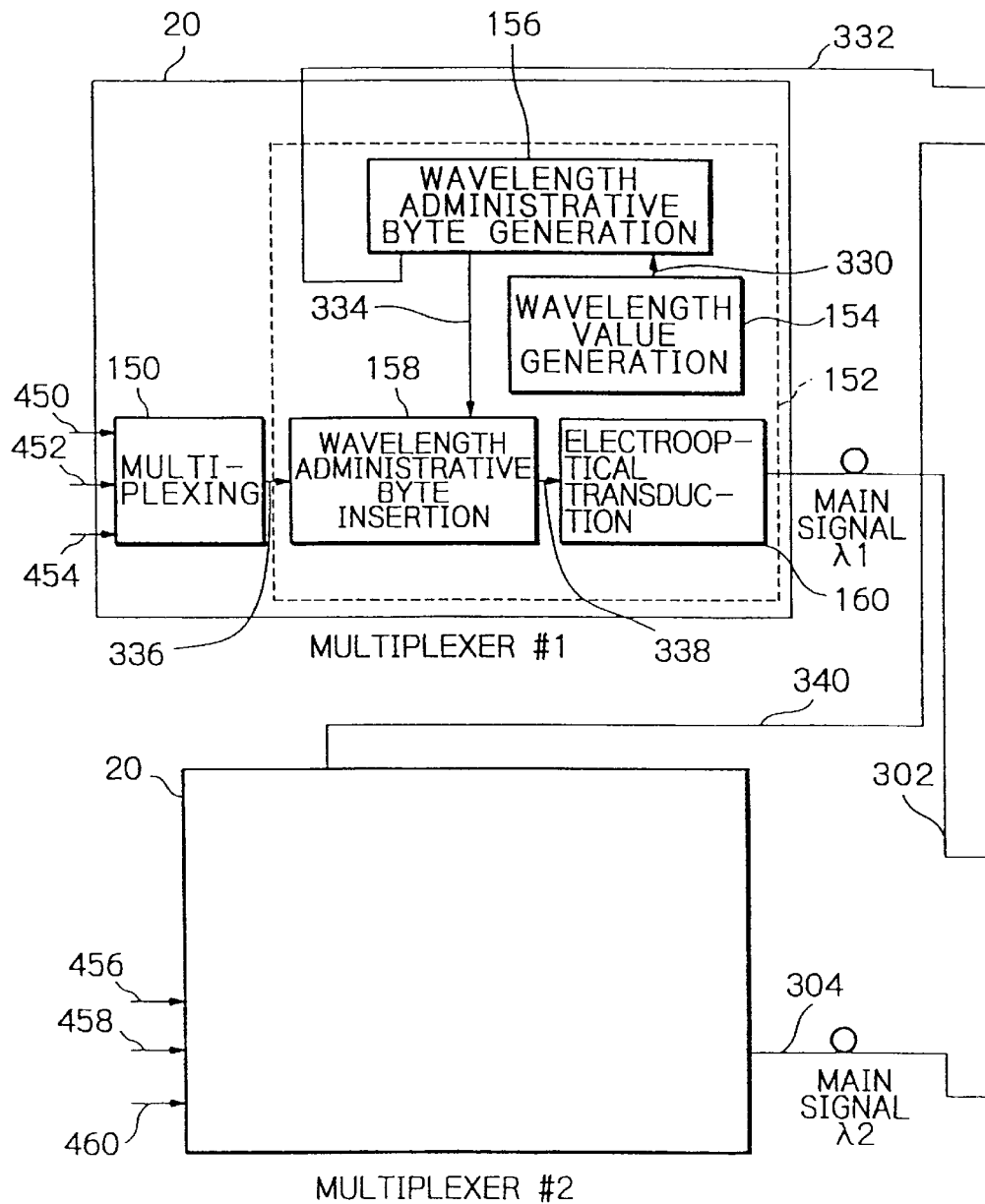

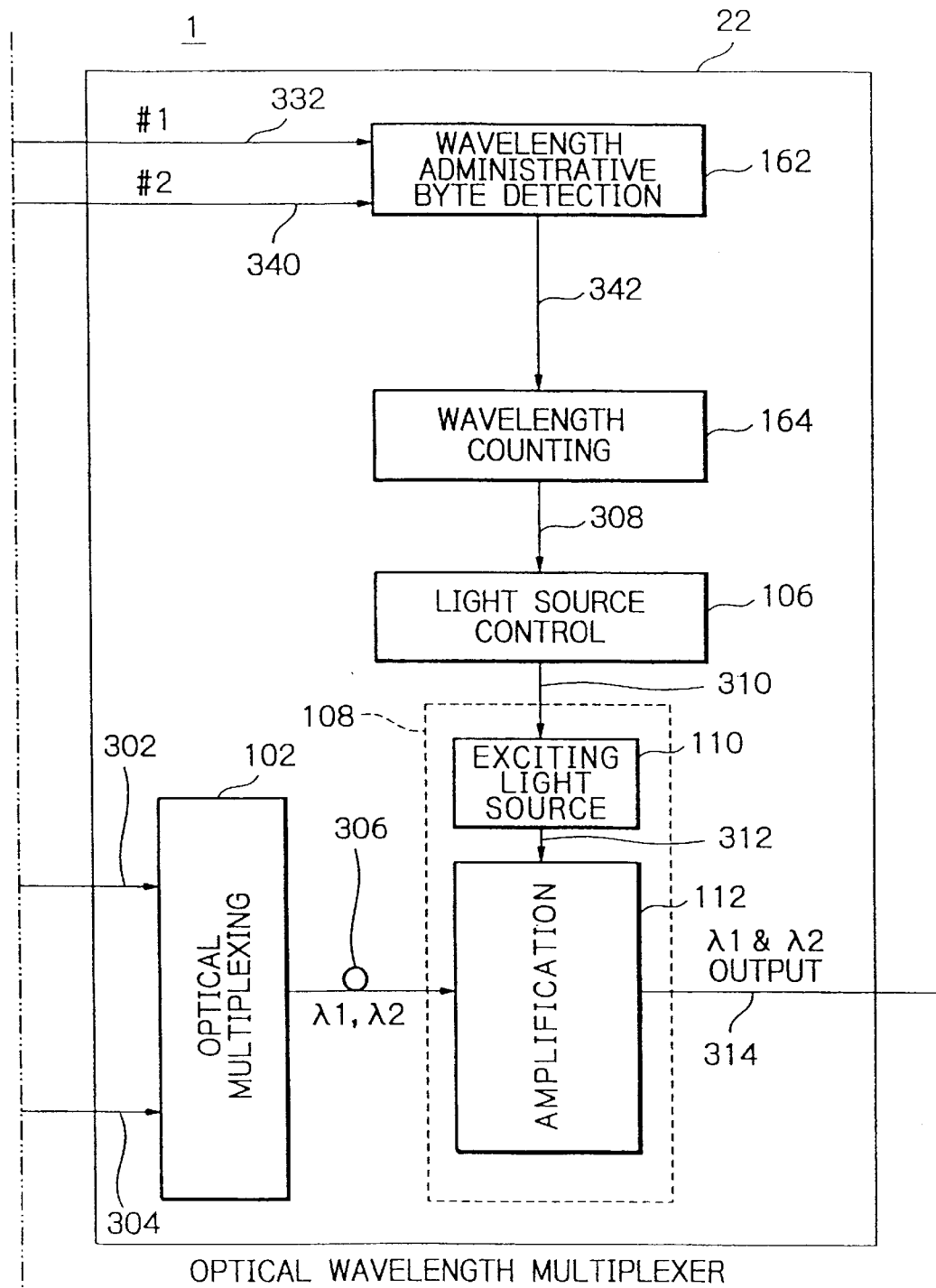

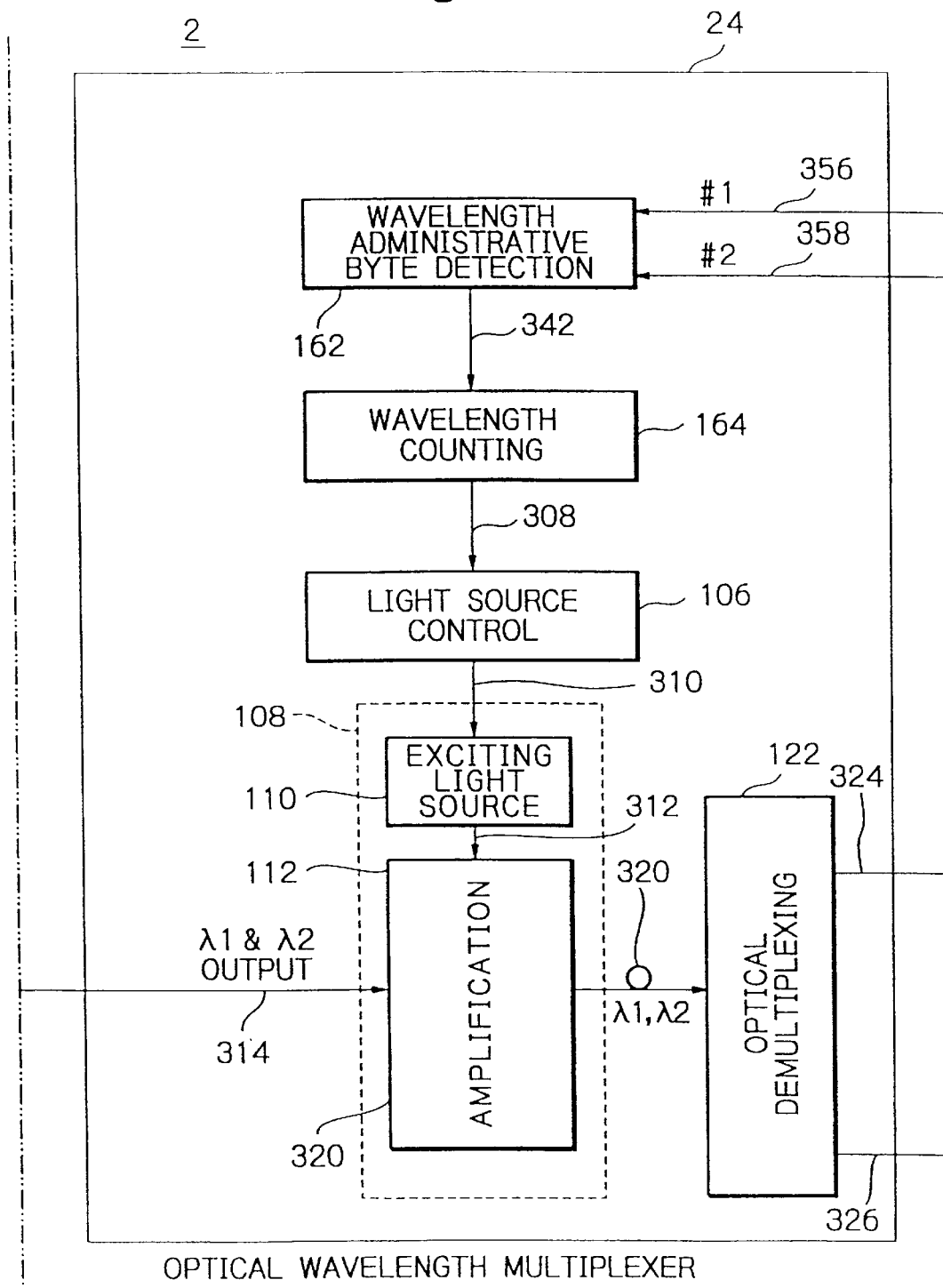

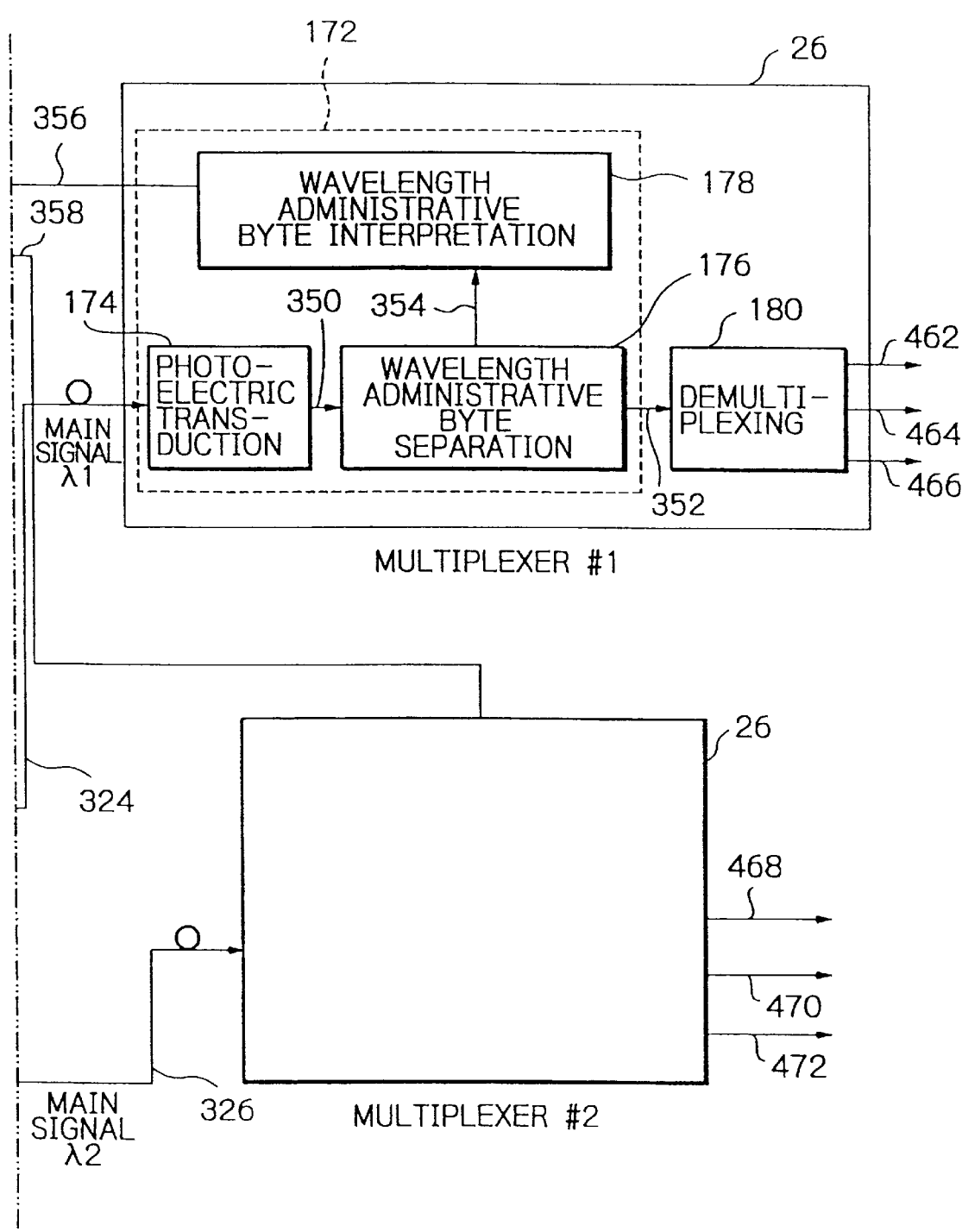

$\lambda_1 = 1,530$nm

1530 = 0001 0101 0011 0000

$\lambda_2 = 1,540$nm

1540 = 0001 0101 0100 0000

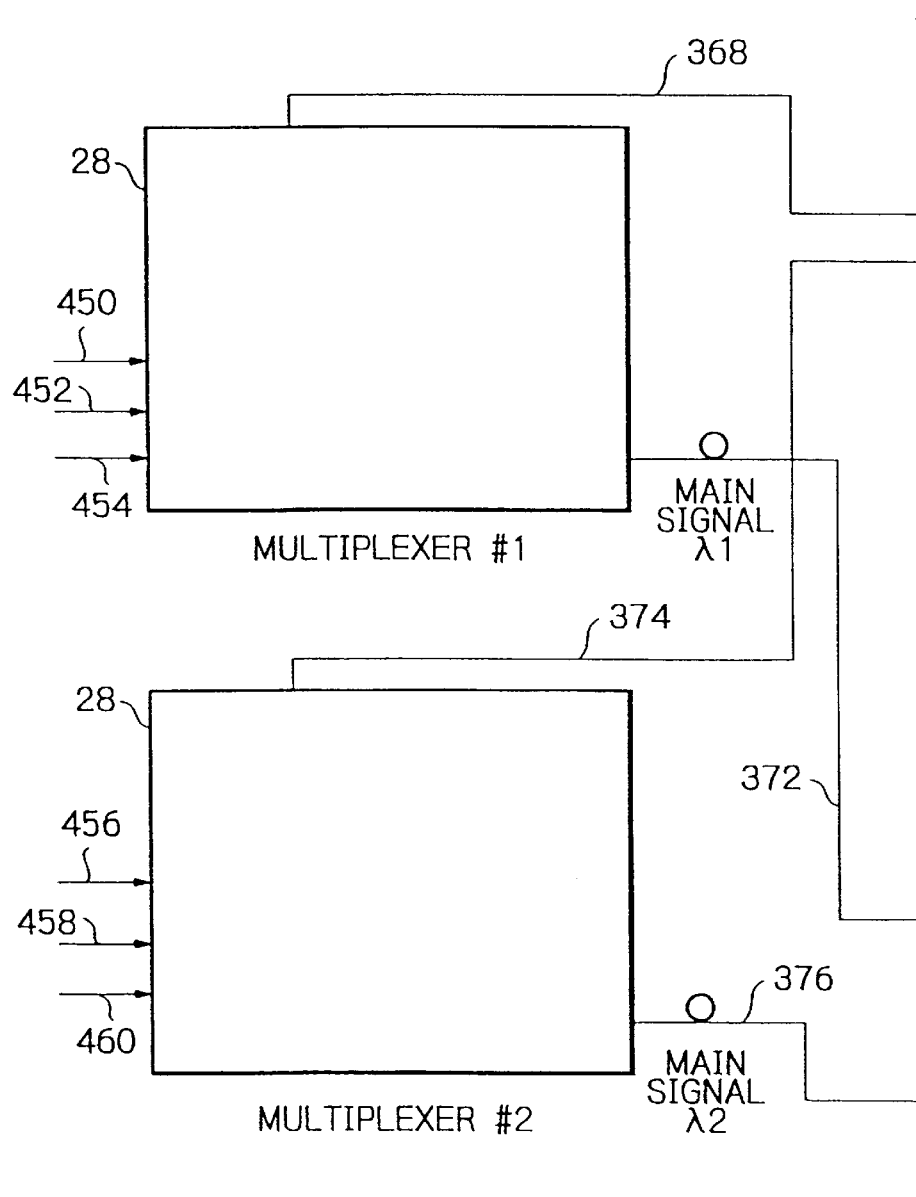

Fig. 6B
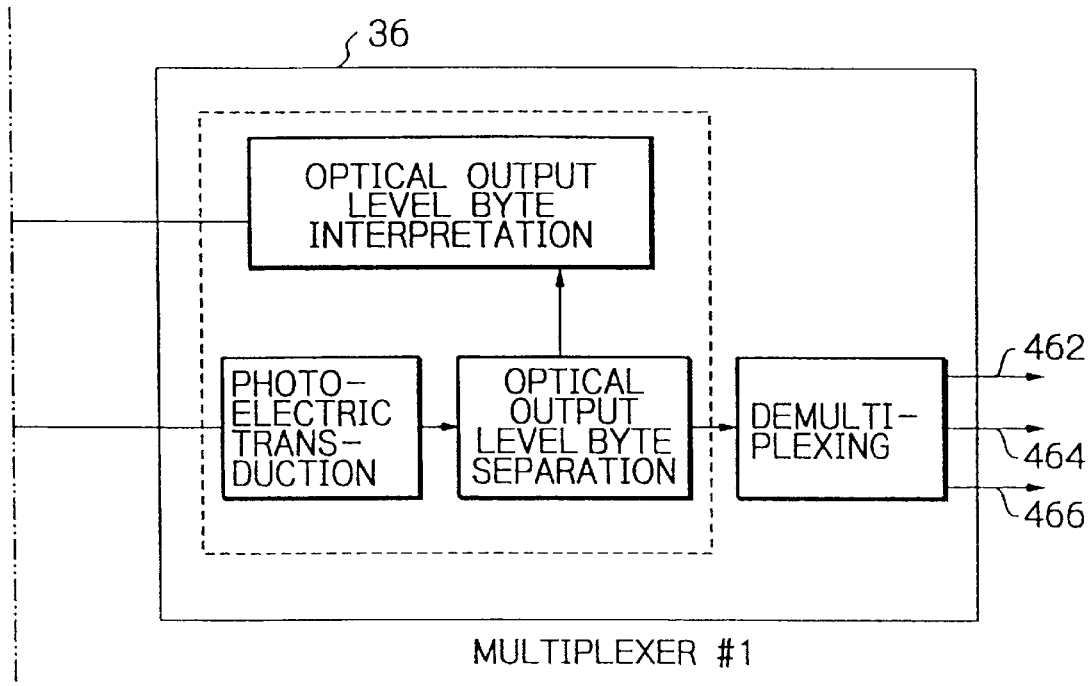
MULTIPLEXER #1
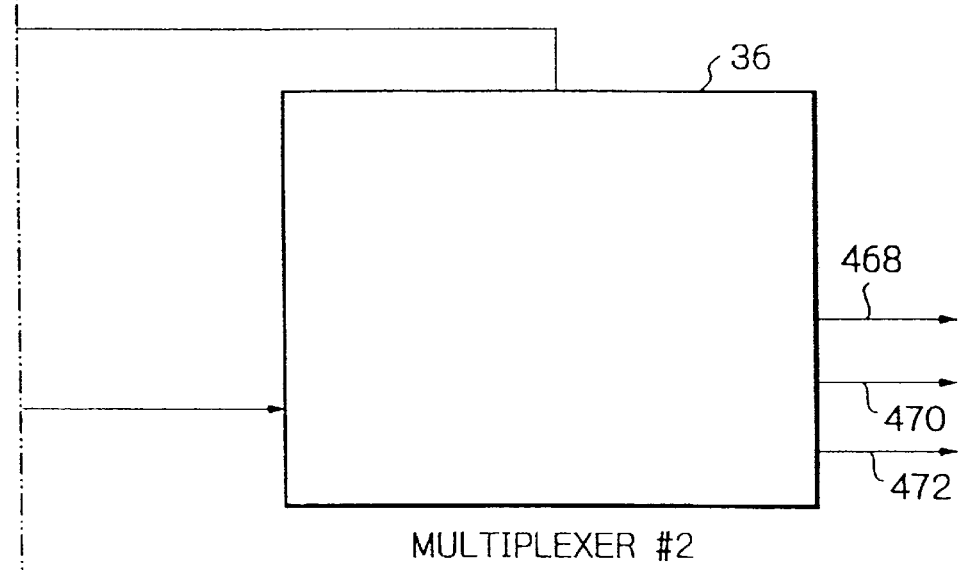
MULTIPLEXER #2

OPTICAL OUTPUT LEVEL OF +5 dBm

INPUTS

OUTPUTS

OPTICAL INPUTS

ATTENUATOR OUTPUTS

AMPLIFIER OUTPUTS

OPTICAL INPUTS

AMPLIFIER OUTPUTS

ATTENUATOR OUTPUTS

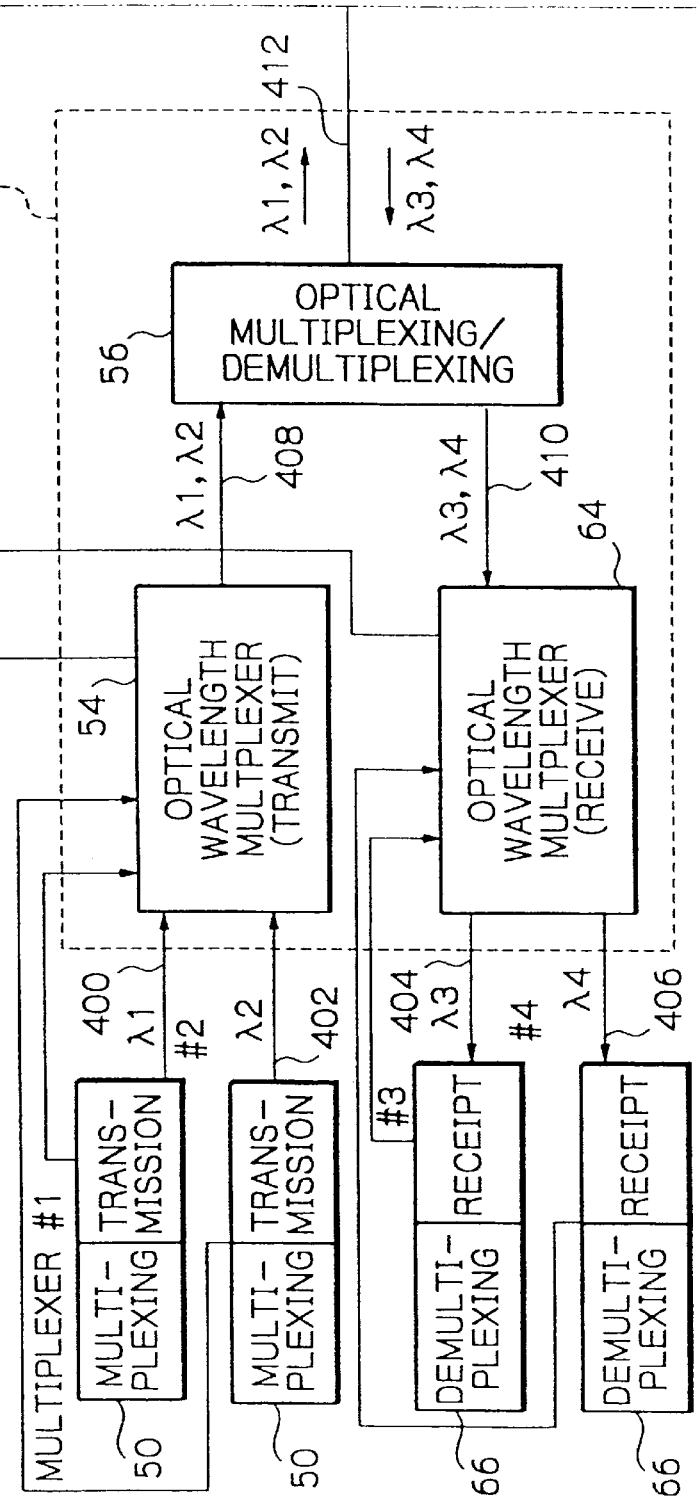

| Fig.12A | Fig.12B |
|---|---|

Fig. 13B
Prior Art

| OVERHEAD | | APPLICATION |
|---|---|---|
| SOH | A1, A2 | STM-1 MAIN FRAME SYNCHRONIZATION |
| | B1 | REPEAT SECTION ERROR MONITORING |
| | B2 | TERMINAL SECTION ERROR MONITORING |
| | PARTS OF K2 | TRANSFER OF PATH CONDITIONS |
| | D1, D2, D3 | MAINTENANCE (192kb/s) |
| | D4~D12 | MAINTENANCE (576kb/s) |
| | E1, E2 | SPEECH COMMUNICATION FOR OPERATOR |
| | C1 | DESIGNATION OF STM-1 MULTIPLEX NO. IN STM-N |
| | K1, K2 | PATH SWITCHING CONTROL |
| | F1 | OPERATOR'S CONVENIENCE |
| | Z1, Z2 | SPARE |

INPUT TO AMPLIFIER

OUTPUT FROM AMPLIFIER

WAVELENGTH MULTIPLEX NUMBER "2"
(2 WAVELENGTHS, AMPLIFICATION A)

INPUT TO AMPLIFIER

OUTPUT FROM AMPLIFIER

WAVELENGTH MULTIPLEX NUMBER "3"
(3 WAVELENGTHS, AMPLIFICATION B)

INPUT TO AMPLIFIER

OUTPUT FROM AMPLIFIER

WAVELENGTH MULTIPLEX NUMBER "3"
(3 WAVELENGTHS, AMPLIFICATION A)

INPUT TO AMPLIFIER

OUTPUT FROM AMPLIFIER

WAVELENGTH MULTIPLEX NUMBER "2"
(2 WAVELENGTHS, AMPLIFICATION C)

OPTICAL OUTPUT LEVEL CONTROL DEVICE FOR AN OPTICAL WAVELENGTH MULTIPLEXER INCLUDED IN AN OPTICAL TRANSMISSION SYSTEM

BACKGROUND OF THE INVENTION

1. Field of the Invention

The present invention relates to an optical output level control device for an optical wavelength multiplexer included in an optical transmission system. More particularly, in an optical transmission system of the type including a plurality of multiplexers, an optical wavelength multiplexer and optical fiber transmission paths connecting them, the present invention is concerned with an optical output level control device for maintaining the optical power output of the wavelength multiplexer at a constant level.

2. Description of the Background Art

Reference will be made to FIGS. 12A and 12B for describing a specific optical transmission system including optical wavelength multiplexers each being implemented with a conventional optical output level control device. As shown in FIG. 12A, a transmitting station, generally 1, includes two multiplexers 10 (sometimes referred to as multiplexers #1 and #2) and an optical wavelength multiplexer 12 each constituting a transmitting section. As shown in FIG. 12B, a receiving station, generally 2, includes an optical wavelength multiplexer 14 and two multiplexers 16 (sometimes referred to as multiplexers #1 and #2) each constituting a receiving section.

The multiplexer #1 of the transmitting station 1 is connected to the multiplexer #1 of the receiving station 2 via an optical fiber 302, the wavelength multiplexer 12, an optical fiber 314, the wavelength multiplexer 14, and an optical fiber 324. Likewise, the multiplexer #2 of the transmitting station 1 is connected to the multiplexer #2 of the receiving station 2 via an optical fiber 304, the wavelength multiplexer 12, the optical fiber 314, the wavelength multiplexer 14, and an optical fiber 326. The wavelength multiplexer 12 is connected to the wavelength multiplexer 14 by the optical fiber 314.

At the transmitting station 1, the multiplexer #1 multiplexes three low-speed optical signals, not shown, to thereby output a high-speed optical signal having a wavelength $\lambda 1$. The $\lambda 1$ high-speed optical signal is fed from the multiplexer #1 to the wavelength multiplexer 12. Likewise, the multiplexer #2 multiplexes three low-speed optical signals, not shown, to thereby output a high-speed optical signal having a wavelength $\lambda 2$. The $\lambda 2$ high-speed optical signal is also fed from the multiplexer #2 to the wavelength multiplexer 12. The wavelength multiplexer 12 multiplexes the $\lambda 1$ and $\lambda 2$ high-speed optical signals, amplifies the resulting multiplex signal to a preselected level with an exciting optical signal whose intensity is determined by a control signal based on the number of wavelengths to be multiplexed. The number of wavelengths to be multiplexed is set by a dip switch circuit or stored in a rewritable memory and is "2" in this specific case. The amplified multiplex signal is sent to the wavelength multiplexer 14 of the receiving station 2 via the optical fiber 314.

At the receiving station 2, the wavelength multiplexer 14 amplifies to a preselected level the received multiplex signal attenuated by the optical fiber 314 with an exciting optical signal whose intensity is determined by a control signal representative of "2" the number of wavelengths to be multiplexed. This number is also set by a dip switch circuit or stored in a rewritable memory and is "2" in this case. The wavelength multiplexer 14 separates, or demultiplexes, the amplified multiplex signal into the $\lambda 1$ and $\lambda 2$ high-speed optical signals. The separated $\lambda 1$ and $\lambda 2$ signals are respectively input to the multiplexers #1 and #2 included in the receiving station 2. These multiplexers #1 and #2 each demultiplexes the respective input signal into the original three low-speed optical signals.

The above system configuration accords to an SDH (Synchronous Digital Hierarchy) transmission system based on a new synchronous interface as prescribed by ITU-T (Telecommunication Standardization Sector of International Telecommunication Union) Recommendations G.707 and G783. In this case, the low-speed signals each has an STM-0 (Synchronous Transfer Module Level Zero) frame structure as prescribed by TTC (Telecommunication Technology Committee) of Japan and corresponding to the above ITU-T Recommendations. The high-speed signals each has an STM-1 frame structure as also prescribed by TTC and shown in FIGS. 13A and 13B.

The wavelength multiplexer 12 at the transmitting station 1 has an optical multiplexing 102, a multiplex number setting 104, a light source control 106, and an optical amplifier 108 made up of an exciting light source 110 and an amplification 112. Likewise, the wavelength multiplexer 14 at the receiving station 2 has a multiplex number setting 104, a light source control 106, an optical amplifier 108 made up of an exciting light source 110 and a n amplification 112, and an optical demultiplexing 122. The multiplex number setting 104, light source control 106 and optical amplifier 108 included in each of the wavelength multiplexers 12 and 14 constitute a conventional optical output level control device.

The operation of the transmitting station 1 is as follows. The multiplexers #1 and #2 respectively output high-speed optical multiplex signals 302 an d 304 respectively having the wavelengths $\lambda 1$ and $\lambda 2$. The signals 302 and 304 are input to the optical multiplexing 102. The optical multiplexing 102 is implemented b y an optical combiner for combining the input signals 302 and 304 and delivering the resulting multiplex high-speed optical signal 306 to the amplification 112 which is implemented by an optical fiber type amplifying circuit. The amplification 112 combines the high-speed optical signal 306 and an exciting optical signal 312 output from the light source 110. Then, the amplification 112 amplifies only signal light contained in the combined optical signal to a preselected level and sends the amplified signal light to the amplification 112 of the receiving station 2 via the optical fiber 314.

The conventional optical output level control device will be described specifically hereinafter. The optical amplification gain of each amplification 112 can be varied by varying the amount of optical power, i.e., the intensity of an exciting signal output from the associated exciting light source 110. Each amplification 112 can amplify only a particular optical wavelength band. If the amplification 112 has a specific gain characteristic shown in FIG. 14, then it can collectively amplify a plurality of wavelengths lying in the 1.55 $\mu$m wavelength band.

It sometimes occurs that an optical amplifier capable of amplifying, e.g., four wavelengths is used to deal with only two or three wavelengths, depending on the optical transmission system to which the amplifier is applied. In light of this, the conventional optical output level control device includes, in addition to the optical amplifier 108, the multiplex number setting 104 for setting the number of wavelengths to be multiplied and the light source control 106 for controlling, based on the number of wavelengths, the amount of optical power to be output from the light source 110.

Assume that the number of wavelengths should be increased, e.g., from two to three, as sometimes desired due to system extension. FIGS. 15A and 15B show a condition wherein the wavelengths $\lambda_1$ and $\lambda_2$ have their optical power level $P_1$ amplified by the optical output level control device to a necessary optical power level $P_2$ by A dB. In this specific case, "2" is set by the multiplex number setting 104 as the number of wavelengths. FIGS. 16A and 16B show a condition wherein the wavelengths $\lambda_1$ and $\lambda_2$ and an additional wavelength $\lambda_3$ have their optical power levels $P_1$ amplified by the optical output level control device to an optical power level $P_3$ by B dB, but the level $P_3$ is short of the necessary level $P_2$.

Stated another way, in the case of FIGS. 15A and 15B, optical power of $P_2+P_2$, i.e., $2P_2$ appears on the output 314 of the amplification 112. Even when the number of input wavelengths is increased from two (FIGS. 15A and 15B) to three (FIGS. 16A and 16B), only the same optical power of $2P_2$ is available on the output 314 of the amplification 112. As a result, the output for a single wavelength is $2P_2/3$ which is short of the necessary power level $P_2$. In any case, when the number of input wavelengths is increased, the necessary power level $P_2$ is not achievable unless the optical power to be output from the light source 110 is increased.

On the other hand, assume that the number of wavelengths is reduced from three to two, as sometimes desired due to, e.g., system reduction. FIGS. 17A and 17B show a condition wherein the input power level $P_1$ of the three input wavelengths $\lambda_1$, $\lambda_2$ and $\lambda_3$ is amplified by the optical output level control device to the necessary optical power level $P_2$ by A dB. In this specific case, "3" is set by the multiplex number setting 104 as the number of wavelengths to be multiplexed. FIGS. 18A and 18B show a condition wherein the wavelength $\lambda_3$ is omitted, and the optical power levels $P_1$ of the other wavelengths $\lambda_1$ and $\lambda_2$ is amplified by the optical output level control device to an optical power level $P_4$ by C dB, but the level $P_4$ is higher than the necessary level $P_2$. It will therefore be seen that when the number of input wavelengths is reduced, the necessary power level $P_2$ is not achievable unless the optical power to be output from the light source 110 is reduced.

The operation of the receiving station 2 shown in FIG. 12B is as follows. The amplification 112, like the amplification 112 of the transmitting station 1, amplifies the high-speed optical signal attenuated by the optical fiber 314 to a preselected level and delivers the amplified signal to the optical demultiplexing 122. The optical demultiplexing 122 is implemented by an optical splitter for separating the input signal into the high-speed signals having the wavelengths $\lambda 1$ and $\lambda 2$, respectively. The $\lambda 1$ and $\lambda 2$ signals are respectively input to the multiplexers #1 and #2. The multiplexers #1 and #2 each demultiplexes the associated high-speed signal into the original three low-speed optical signals.

The multiplex number settings 104 of the above conventional system each is implemented by a dip switch circuit or an EEPROM (Electrically Erasable Programmable Read Only Memory) or similar rewritable memory.

Further, as shown in FIGS. 8A and 8B, the wavelengths input from the multiplexers to the optical wavelength multiplexer are sometimes different in optical power from each other. In this condition, the optical power output from the wavelength multiplexer would become irregular. To solve this problem, it has been customary to provide the input side or the output side of the optical amplifier with an optical branch unit, an optical power monitor, an optical variable attenuator and an attenuator control circuit for each of different wavelengths so as to reduce a difference in optical power between the wavelengths.

However, the problem with the dip switch scheme or the EEPROM scheme is that when the number of wavelengths is varied, it is necessary to alter the setting of the dip switch circuit or to update the data stored in the EEPROM by a troublesome procedure. In addition, the alteration of the dip switch setting or the updating of the EEPROM is apt to bring about errors.

Moreover, when the wavelengths input from the multiplexers to the optical wavelength multiplexer are different in optical power from each other, the wavelength multiplexer must be provided with a particular combination of an optical branch unit, an optical power monitor, an optical variable attenuator and an attenuator control circuit for each of different wavelengths. This undesirably sophisticates the circuit arrangement.

SUMMARY OF THE INVENTION

It is therefore an object of the present invention to provide an optical output level control device for an optical wavelength multiplexer eliminating the need for the alteration of the setting of a dip switch circuit or the rewriting of data stored in a rewritable memory when the number of wavelengths is varied.

It is another object of the present invention to provide a simple optical output level control device for an optical wavelength multiplexer capable of controlling, even when wavelengths output from multiplexers are different in optical power level from each other, the wavelengths to the same optical power when output from an optical wavelength multiplexer.

In accordance with the present invention, in an optical output control device for an optical wavelength multiplexer included in an optical transmission system including at least a first and a second multiplexer and a first optical wavelength multiplexer situated at a transmitting station, the first multiplexer includes a first multiplexing circuit for transforming a plurality of preselected low-speed optical signals input thereto to corresponding electric signals, and multiplexing the electric signals to thereby output a high-speed signal A first transmitting circuit receives the high-speed signal from the first multiplexing circuit, generates first wavelength data representative of the wavelength of light output from the first multiplexer, inserts the first wavelength data at a preselected position of the high-speed signal, and transforms the high-speed signal with the first wavelength data to a first high-speed optical signal having the above wavelength. The second multiplexer includes a second multiplexing circuit for transforming a plurality of preselected low-speed optical signals input thereto to corresponding electric signals, and multiplexing the electric signals to thereby output a high-speed signal. A second transmitting circuit receives the high-speed signal from the second multiplexing circuit, generates second wavelength data representative of the wavelength of light output from the second multiplexer, inserts the second wavelength data at a preselected position of the high-speed signal, and transforms the high-speed signal with the second wavelength data to a second high-speed optical signal having the above wavelength. The first optical wavelength multiplexer includes a first wavelength multiplexing circuit for multiplexing the wavelength of the first high-speed optical signal and the wavelength of the second high-speed optical signal, and a first control light amplifying circuit. The first control light amplifying circuit receives the high-speed optical signal from the first wavelength multiplexing circuit, receives the first wavelength data from the first transmitting circuit, receives the second wavelength data from the second transmitting circuit, counts different wavelengths on the basis of the first wavelength data and second wavelength data, and amplifies the high-speed optical signal with an exciting optical signal whose intensity is determined by a control signal based on the number of wavelengths counted.

BRIEF DESCRIPTION OF THE DRAWINGS

The objects and features of the present invention will become more apparent from the consideration of the following detailed description taken in conjunction with the accompanying drawings in which:

FIG. 1 shows how FIGS. 1A, 1B, 1C and 1D are combined;

FIGS. 1A–1D are block diagrams schematically showing a specific optical transmission system including a transmitting station and a receiving station each including a first embodiment of the optical output level control device in accordance with the present invention;

FIG. 3 shows how

FIGS. 3A and 3B are block diagrams schematically showing a transmitting station to which a second embodiment of the present invention is applied;

FIG. 4 shows how

FIGS. 4A and 4B are schematic block diagrams showing a receiving station to which the second embodiment is also applied;

FIG. 5 shows how FIGS. 5A and 5B are combined;

FIGS. 5A and 5B are schematic block diagrams showing a transmitting station to which a third embodiment of the present invention is applied;

FIG. 6 shows how FIGS. 6A and 6B are combined;

FIGS. 6A and 6B are schematic block diagrams showing a receiving station to which the third embodiment is also applied;

FIG. 11 shows how FIGS. 11A and 11B are combined;

FIGS. 11A and 11B are schematic block diagrams showing a fourth embodiment of the present invention;

FIGS. 12A and 12B are schematic block diagrams showing a transmitting station and a receiving station each including a conventional optical output level control device;

FIGS. 13A and 13B show a specific frame structure of an STM-1 frame signal;

FIGS. 18A and 18B show a specific operation of the optical amplifier included in the the conventional control device of FIGS. 12A and 12B.

DESCRIPTION OF THE PREFERRED EMBODIMENTS

Figure 2A:
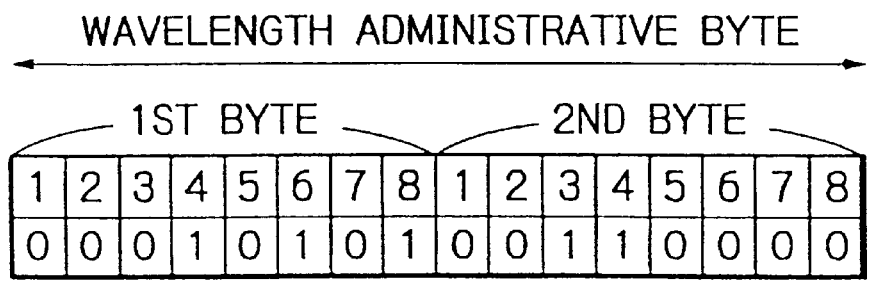
FIGS. 2A and 2B demonstrate the operation of a specific wavelength administrative byte generating circuit included in the first embodiment.

Preferred embodiments of the optical output level control device in accordance with the present invention and free from the problems discussed earlier will be described hereinafter.

First Embodiment

Referring to FIGS. 1A–1D, an optical output level control device embodying the present invention will be described. As shown in FIGS. 1A and 1B, a transmitting station, generally 1, is included in an optical transmission system and made up of two multiplexers 20 (sometimes referred to as multiplexers #1 and #2 hereinafter) and an optical wavelength multiplexer 22 each constituting a transmitting section. As shown in FIGS. 1C and 1D, a receiving station, generally 2, is also included in the optical transmission system and made up of an optical wavelength multiplexer 24 and two multiplexers 26 (sometimes referred to multiplexers #1 and #2 hereinafter) each constituting a receiving section.

The multiplexer #1 of the transmitting station 1 is connected to the multiplexer #1 of the receiving station 2 by an optical fiber 302, the optical wavelength multiplexer 22, an optical fiber 314, the optical wavelength multiplexer 24, and an optical fiber 324. Likewise, the multiplexer #2 of the transmitting station 1 is connected to the multiplexer #2 of the receiving station by a n optical fiber 304, the optical wavelength multiplexer 22, the optical fiber 314, the optical wavelength multiplexer 24, and an optical fiber 326. The optical wavelength multiplexer 22 is connected to the optical wavelength multiplexer 24 by the optical fiber 314.

At the transmitting station 1, the multiplexer #1 multiplexes three low-speed optical signals 450, 452 and 454 so as to produce a multiplex high-speed signal. Then, the multiplexer #1 inserts wavelength data representative of a wavelength $\lambda_1$ in a preselected position of the high-speed signal, thereby producing a high-speed optical signal having a wavelength $\lambda_1$. The wavelength data is implemented by a decimal number or a binary number. The $\lambda_1$ high-speed optical signal is fed from the multiplexer #1 to the wavelength multiplexer 22 via the optical fiber 302. At the same time, the wavelength data in the form of a decimal number or a binary number is delivered to the wavelength multiplexer 22 via a signal line 332. The other multiplexer #2 is identical in construction and operation with the multiplexer #1 except that it multiplexes three low-speed optical signals 456, 458 and 460, inserts wavelength data representative of a wavelength $\lambda_2$ in a preselected position of the resulting high-speed signal, and feeds the resulting $\lambda_2$ high-speed optical signal to the wavelength multiplexer 22 while feeding the wavelength data to the multiplexer 22 via a signal line 340. The $\lambda_2$ wavelength data is also implemented by a decimal number or a binary number.

The wavelength multiplexer 22 multiplexes the input $\lambda_1$ and $\lambda_2$ high-speed optical signals. At the same time, the wavelength multiplexer 22 counts the different wavelengths input via the signal lines 332 and 340 and each being represented by particular wavelength data. The number of wavelengths is "2" in the illustrative embodiment. Then, the wavelength multiplexer 22 amplifies the multiplex high-speed optical signal to a preselected level with an exciting optical signal whose intensity is controlled by a control signal based on the above count. The amplified high-speed optical signal is sent from the wavelength multiplexer 22 to the wavelength multiplexer 24 of the receiving station 2 via the optical fiber 314.

The wavelength multiplexer 24 counts the different wavelengths ("2" in the illustrative embodiment) on the basis of the wavelength data respectively fed from the associated multiplexers #1 and #2 (26) via signal lines 356 and 358. Then, the wavelength multiplexer 24 amplifies the received high-speed optical signal attenuated by the optical fiber 314 to a preselected level with an exciting optical signal whose intensity is controlled by a control signal based on the above count. Subsequently, the wavelength multiplexer 24 separates the amplified high-speed optical signal into the high-speed optical signals respectively having the wavelengths $\lambda_1$ and $\lambda_2$. The separated $\lambda_1$ and $\lambda_2$ signals are fed to the multiplexers #1 and #2, respectively.

The multiplexer #1 (26) converts the input $\lambda_1$ high-speed optical signal to a corresponding electric signal, separates the $\lambda_1$ wavelength data contained in the electric signal, and feeds the wavelength data to the wavelength multiplexer 24 via the signal line 356. At the same time, the multiplexer #1 demultiplexes the electric signal into three low-speed optical signals 462,464 and 466. Likewise, the multiplexer #2 (26) converts the input $\lambda_2$ high-speed optical signal to an electric signal, separates the $\lambda_2$ wavelength data contained in the electric signal, and feeds the wavelength data to the wavelength multiplexer 24 via the signal line 358. At the same time, the multiplexer #2 demultiplexes the electric signal into three low-speed optical signals 468,470 and 472.

Specifically, as shown in FIGS. 1A and 1B, each multiplexer 20 at the transmitting station 1 has a multiplexing 150 and a transmission circuit 152 made up of a wavelength value generation 154, a wavelength administrative byte generation 156, a wavelength administrative byte insertion 158, and a electrooptical transduction 160. The wavelength multiplexer 22 has an optical multiplexing 102, a light source control 106, an optical amplifier 108 made up of an exciting light source 110 and an amplification 112, a wavelength administrative byte detection 162, and a wavelength counting 164.

Figures 12, 12A:
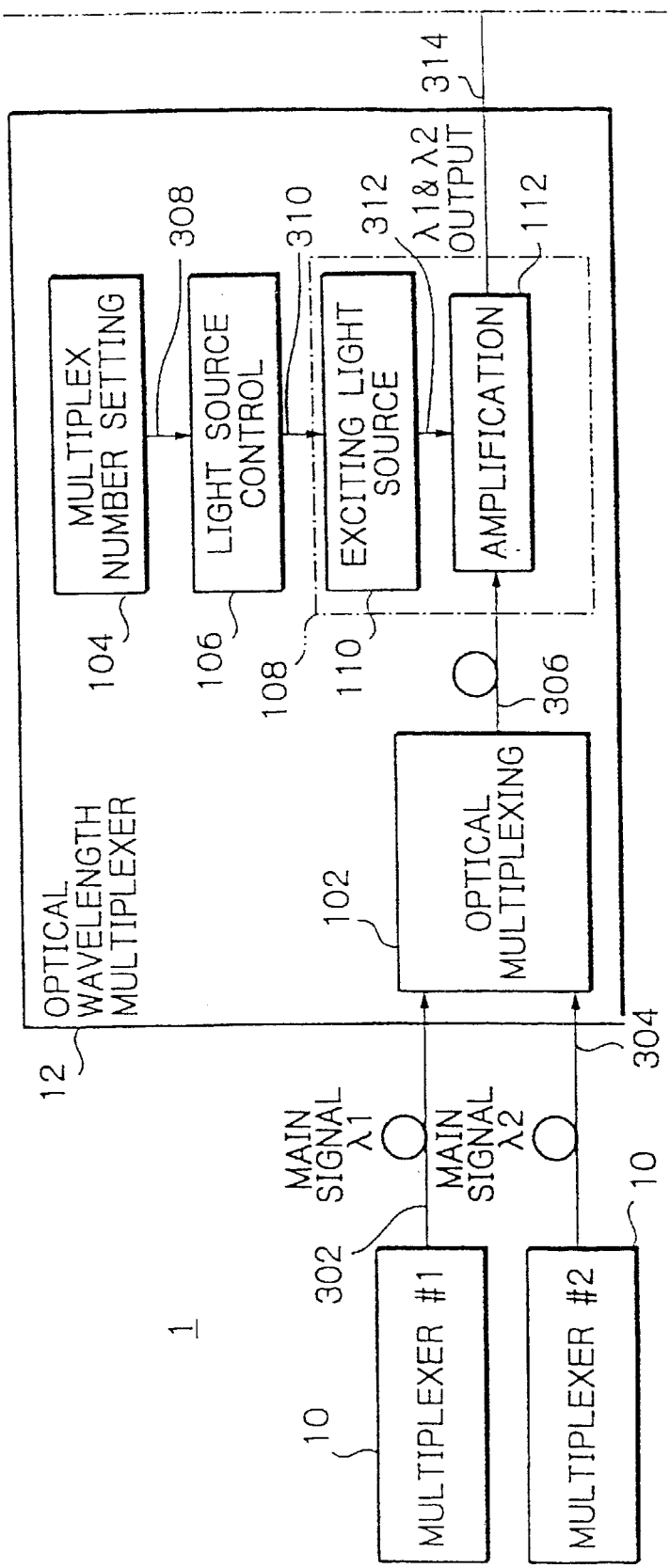
FIG. 12 shows how
FIGS. 12A and 12B are combined.
Figure 12B:
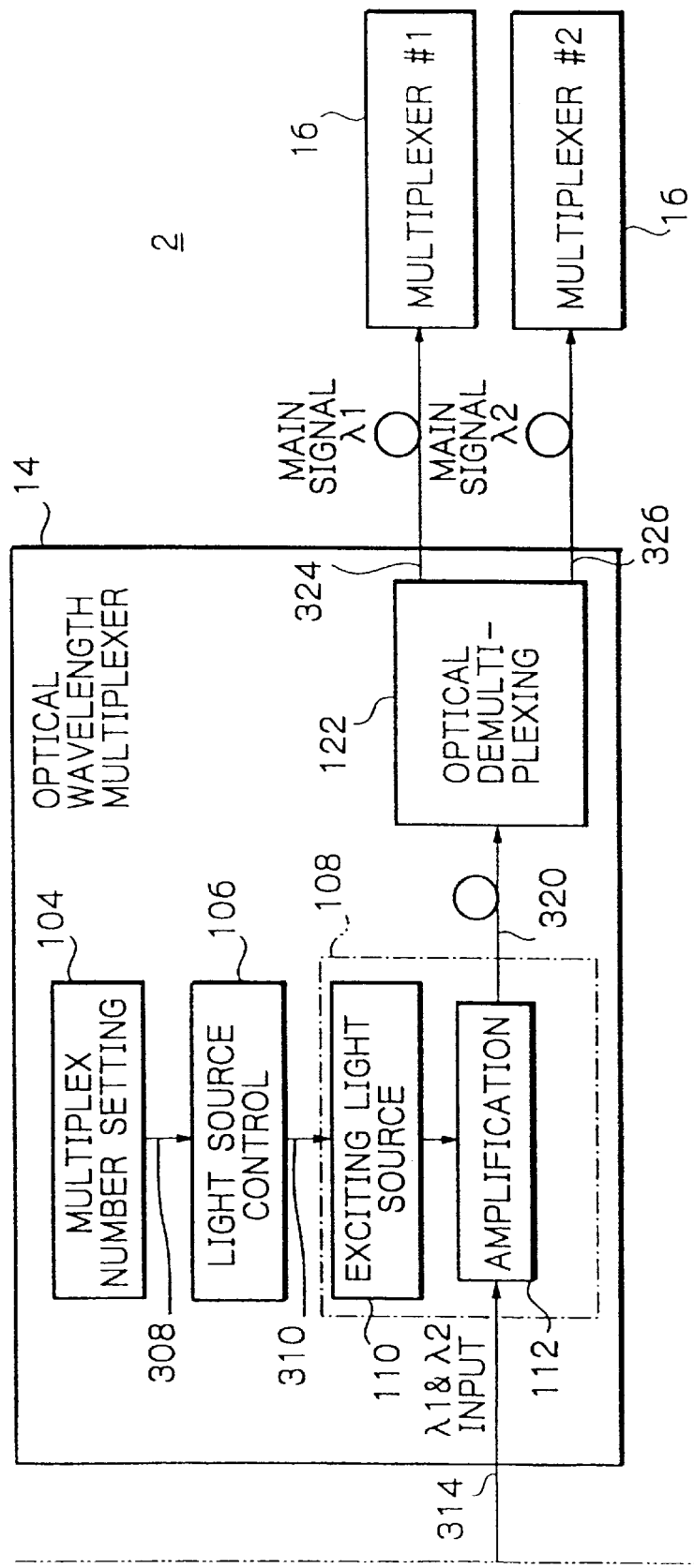

At the transmitting station 1, an optical output level control device is constituted by the wavelength value generation 154, wavelength administrative byte generation 156 and wavelength administrative byte insertion 158 included in the multiplexer 20 and the light source control 106, optical amplifier 108, wavelength administrative byte detection 162 and wavelength counting 164 included in the wavelength multiplexer 22. In this respect, the conventional multiplexer 10 is constituted by the multiplexing 150 and electrooptical transduction 160. In FIGS. 1A and 1B, the blocks identical with the blocks shown in FIG. 12 are designated by the same reference numerals and will not be described specifically in order to avoid redundancy.

The three signals 450–454 or 456–460 input to the multiplexing 150 each has the STM-0 frame structure mentioned earlier. By multiplexing the signals 450–454 or 456–460, the multiplexing 150 produces a multiplex signal having the STM-1 frame structure on its output 336 which is connected to the corresponding input of the wavelength administrative byte insertion 158.

In the illustrative embodiment, the wavelength value generation 154 is implemented by a dip switch circuit or a ROM (Read Only Memory) and generates a wavelength value represented by a decimal number. The wavelength value output from the generation 154 is fed to the wavelength administrative byte generation 136. Specifically, the wavelength value generation 154 of the multiplexer #1 generates a signal shown in FIG. 2A and represented by a decimal number indicative of a wavelength of 1,530 nm ($\lambda_1$). The wavelength value generation 154, not shown, of the multiplexer #2 generates a signal shown in FIG. 2B and represented by a decimal number indicative of a wavelength of 1,540 nm ($\lambda_2$).

The signal output from the wavelength value generation 154 will be described more specifically hereinafter, taking the wavelength of 1,530 nm as an example. In this specific case, the units digit, tens digit, hundreds digit and thousands digit are "0", "3", "5" and "1", respectively. When use is made of a ROM, "0" of the units digit, "3" of the tens digit, "5" of the hundreds digit and "1" of the thousands digit are stored in the form of four-bit data "0000", "0011", "0101", and "0001", respectively. To read such data out of the ROM, the wavelength administrative byte generation 156 sends a read control signal to the ROM, although not shown specifically.

When use is made of dip switch circuitry in place of a ROM, a switch circuit constituting the units digit outputs four-bit data "0000". Likewise, switch circuits constituting the tens digit, hundreds digit and thousands digit respectively output four-bit data "0011", "0101" and "0001". The wavelength data to be stored in the ROM or output from the dip switch circuitry may be represented by a binary number, if desired.

In the illustrative embodiment, the output line 332 or 340 connected to the output of the wavelength administrative byte generation 156 is implemented by a plurality of signal lines. The administrative byte generation 156 adds a preselected framing signal to the head of the decimal wavelength data applied to its input 330, and outputs the resulting frame signal to preselected one of the signal lines constituting the output line 332 or 340. Further, the administrative byte generation 156 outputs a clock signal synchronous with the above decimal wavelength data and framing signal to another signal line of the output line 332 or 340. In addition, the administrative byte generation 156 outputs the decimal wavelength data via its output 334.

In the illustrative embodiment, the administrative byte generation 156 feeds each of the above two different signals, i.e., the frame signal consisting of the framing signal and decimal wavelength data and the clock signal synchronous with the frame signal to the administrative byte detection 162 via a particular signal line, as stated above. Such a system may be replaced with a system using the overhead access function (Recommendation G.783), if desired. In the system using the overhead access function, the administrative byte generation 156 may send three different signals, i.e., the decimal wavelength data, a frame pulse (FP) indicative of the position of a byte D1 heading D bytes, and a clock signal synchronous with the decimal data and FP to the administrative byte detection 162 via preselected different lines.

The administrative byte generation 156 of the multiplexer #1 produces on its output 334 the data of the first byte shown in FIG. 2A at the timing of the byte D1, and produces the data of the second byte shown in FIG. 2A at the timing of a byte D2.

Figure 2B:
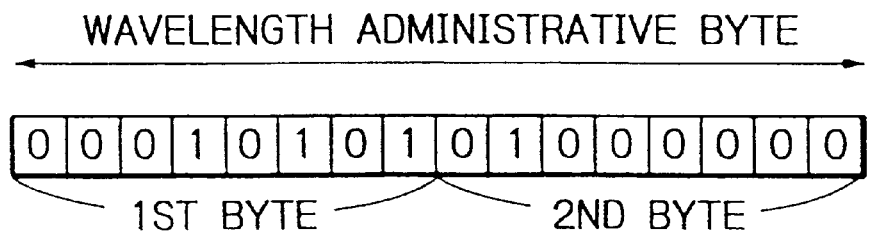

The administrative byte generation 156 of the multiplexer #2 produces on its output 334 the data of the first byte shown in FIG. 2B at the timing of the byte D1, and produced the data of the second byte shown in FIG. 2B at the timing of a byte D2. The outputs 332 and 340 each is connected to a particular input of the administrative byte detection 162. In this specific case, a byte D3 is not used because the wavelength data has two bytes. If use m a d e of the overhead access function, then the administrative byte generation 156 should only send preselected data in place of the data synchronous with the timings of the bytes D1 and D2.

Figure 13A:
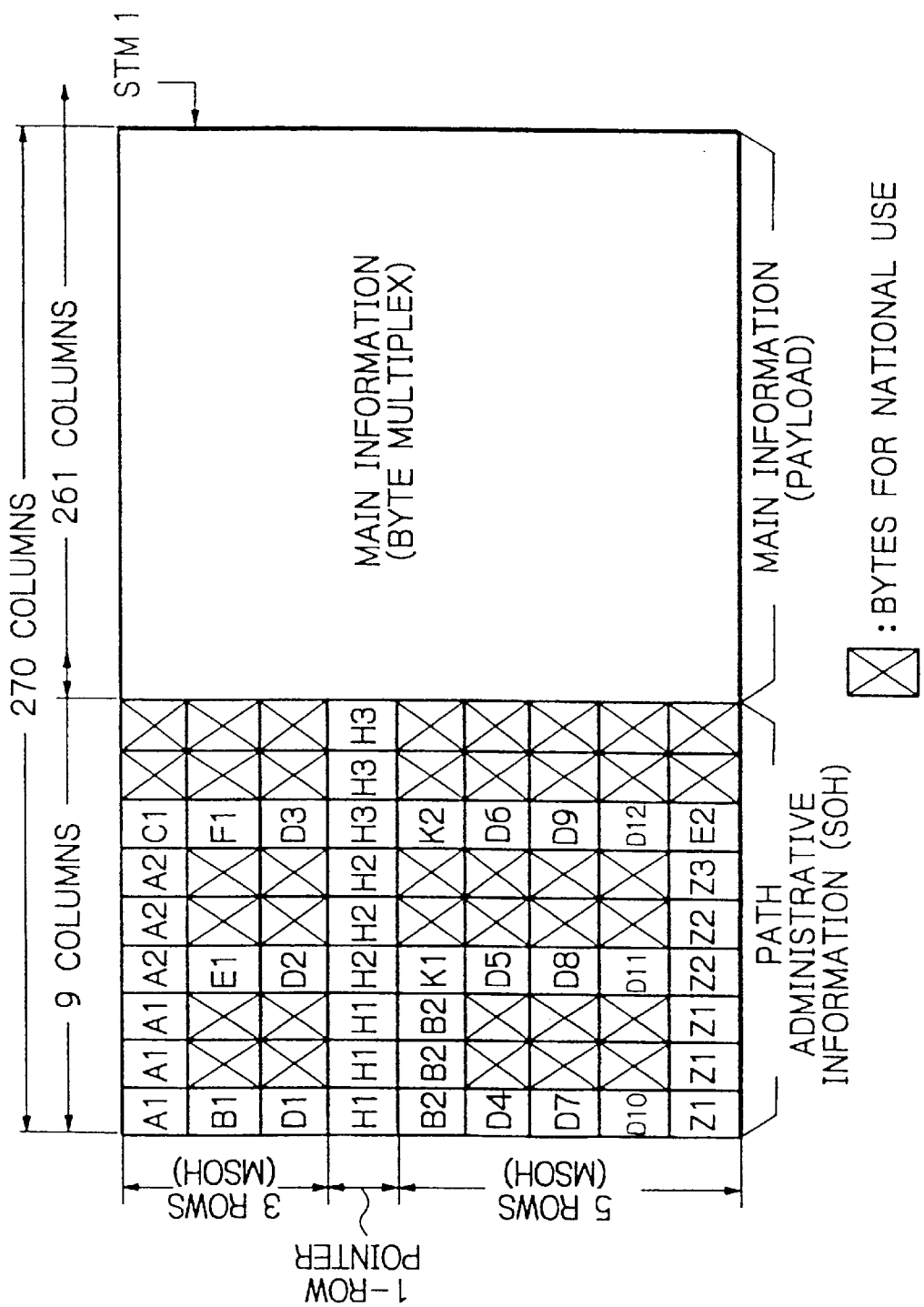
Figure 14:
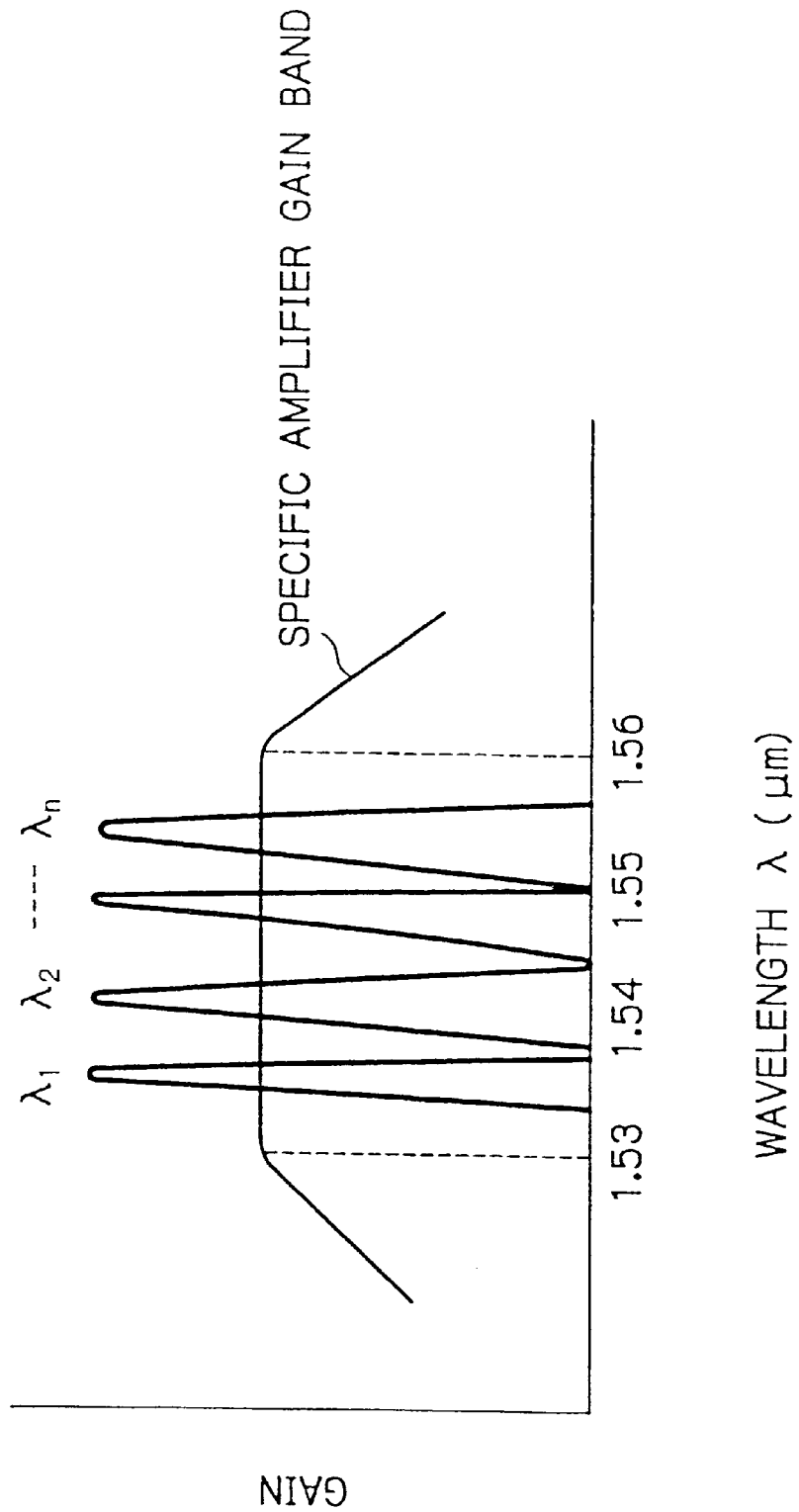
FIG. 14 shows a specific operation of an optical amplifier included in the conventional control device of FIGS. 12A and 12B.
Figure 15A:
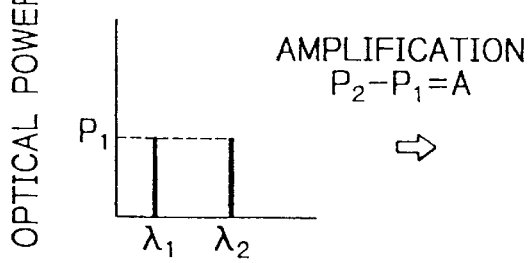
FIGS. 15A and 15B show a specific operation of the optical amplifier included in the the conventional control device of FIGS. 12A and 12B.
Figure 15B:
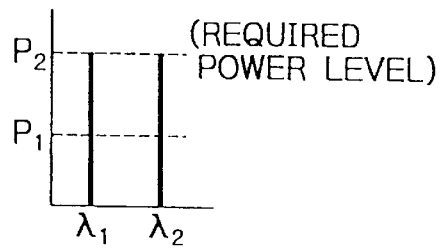
Figure 16A:
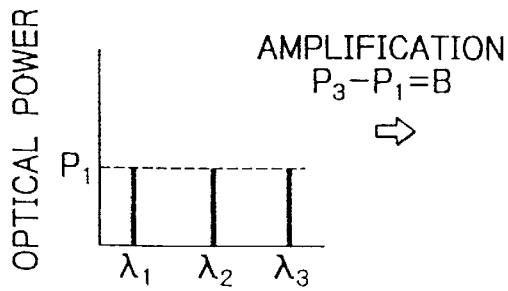
FIGS. 16A and 16B show a specific operation of the optical amplifier included in the the conventional control device of FIGS. 12A and 12B.
Figure 16B:
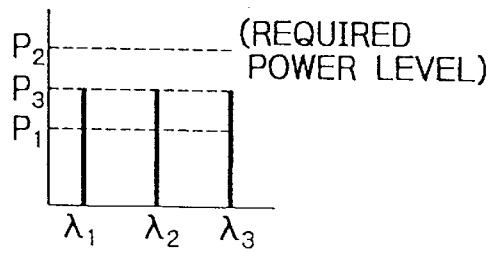
Figure 17A:
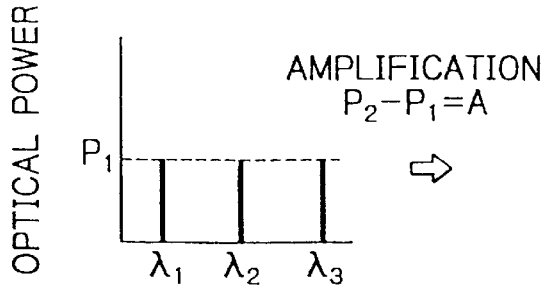
FIGS. 17A and 18B show a specific operation of the optical amplifier included in the the conventional control device of FIGS. 12A and 12B.
Figure 17B:
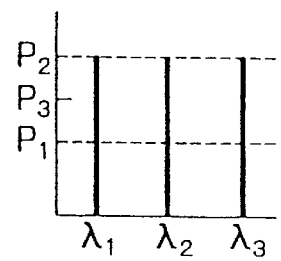
Figure 18A:
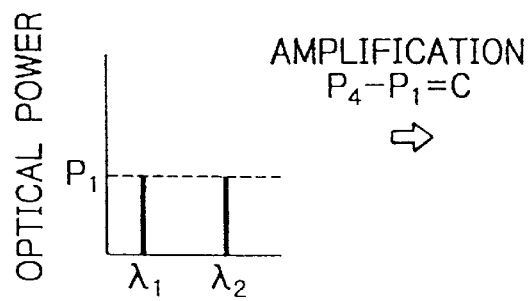
Figure 18B:
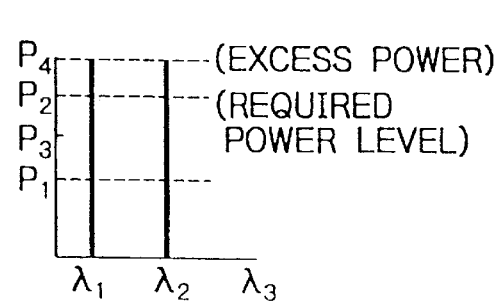

The signal fed from the multiplexing 150 to the wavelength administrative byte insertion 158 has the STM-1 frame structure shown in FIGS. 13A and 13B, as stated earlier. As shown in FIG. 13A, the STM-1 frame structure has a transmission path administrative information area or SOH (Section Over Head) and a main information area or payload accommodating multiplex information. The SOH consists of an RSOH (Regenerator Section Over Head), pointers, and an MSOH (Multiplex Section Over Head). In the SDH transmission system, a multiplexer executes processing with all of nine rows included in the SOH of the STM-1 frame.

Specifically, the multiplexing 150 delivers to the administrative byte insertion 158 the STM-1 frame signal in which the bytes D1–D3 are unused. The administrative byte generation 156 delivers to the administrative byte insertion 158 the data of the first byte of FIG. 2A or 2B and the data of the second byte of FIG. 2A or 2B in synchronism with the bytes D1 and D2, respectively, which are input from the multiplexer 150. As a result, the administrative byte insertion 158 produces on its output 338 a n STM-frame signal having the multiplexed wavelength data represented by a decimal number at the positions of the bytes D1 and D2. The output 338 is connected to the electrooptical transduction 160.

The electrooptical transduction 160 of the multiplexer #1 (20) is made up of a semiconductor laser with the wavelength $\lambda_1$ and a laser driver. The transduction 160 delivers the signal (serial logical data) received via the input 338 to the laser via the laser driver so as to transform the input logical data to an optical intensity signal, and outputs the optical intensity signal via the optical fiber 302. This is also true with the electrooptical transduction 160, not shown, of the multiplexer #2 (20) except that it includes a semiconductor laser with the wavelength $\lambda_2$ and outputs an optical intensity signal via the optical fiber 304.

The administrative byte detection 162 of the transmitting station 1 detects the wavelength values $\lambda_1$ and $\lambda_2$ respectively input from the multiplexers #1 and #2 (20) via the inputs 332 and 340. Likewise, the administrative byte detection 162 of the receiving station 2 detects the wavelength values $\lambda_1$ and $\lambda_2$ respectively input from the multiplexers #1 and #2 (26) via the inputs 356 and 358. The detections 162 each produces the detected wavelength data $\lambda_1$ and $\lambda_2$ on its output 342 which is connected to the wavelength counting 164.

The wavelength counting 164 of each of the transmitting station 1 and receiving station 2 determines the number of different wavelength data applied to its input 342, and produces data representative of the number or count ("2" in the illustrative embodiment) on its output 308. The output 308 is connected to the light source control 106.

As shown in FIGS. 1C and 1D), each multiplexer 26 at the receiving station 2 has a receipt circuit 172 made up of a photoelectric transduction 174, a wavelength administrative byte separation 176 and a wavelength administrative byte interpretation 178, and a demultiplexing 180. The wavelength multiplexer 24 has an optical demultiplexing 122, a light source control 106, an optical amplifier 108 made up of an exciting light source 110 and an amplification 112, a wavelength administrative byte detection 162, and a wavelength counting 164. At the receiving station 2, an optical output level control device is constituted by the light source control 106, optical amplifier 108, wavelength administrative byte detection 162 and wavelength counting 164 included in the wavelength multiplexer 24, and the wavelength administrative byte separation 176 and wavelength administrative byte interpretation 178 included in each multiplexer 26. In this respect, the conventional multiplexer 16 is made up of the photoelectric transduction 174 and demultiplexing 180. In FIGS. 1C and 1D, the blocks identical with the blocks shown in FIGS. 1A and 1B are designated by the same reference numerals and will not be described specifically in order to avoid redundancy.

The STM-1 frame signal output from the multiplexer #1 or #2 (20) of the transmitting station 1 and having the decimal multiplexed wavelength data $\lambda_1$ or $\lambda_2$ in the bytes D1 and D2 of the RSOH is applied to the input 324 or 326 of the photoelectric transduction 174. The transduction 174 is implemented by a photosensitive device and an amplifier and receives the optical intensity signal via the optical fiber 324 or 326. The transduction 174 transforms the optical intensity signal to an electric signal, amplifies the electric signal to a preselected level with the amplifier, and produces the amplified electric signal on its output 350. The amplified electric signal is a high-speed signal or serial logical data having the STM-1 frame structure. The output 350 is connected to the input of the administrative byte separation 176.

The administrative byte separation 176 directly outputs the signal applied to its input 350 to its output 352. At the same time, the separation 176 separates the wavelength data $\lambda_1$ or $\lambda_2$ of the bytes D1 and D2 from the above input signal and feeds them to the administrative byte interpretation 178 via its output 354. If desired, the separation 176 may separate the wavelength data $\lambda_1$ or $\lambda_2$ by using the overhead access function mentioned earlier.

In the illustrative embodiment, the output line 356 or 358 connected to the output of of the administrative byte interpretation 178 is implemented by a plurality of signal lines. The interpretation 178 adds a preselected framing signal to the head of the decimal wavelength data $\lambda_1$ or $\lambda_2$ applied to its input 354, and outputs the resulting frame signal to preselected one of the signal lines constituting the output line 356 or 358. Further, the interpretation 178 outputs a clock signal synchronous with the above decimal wavelength data $\lambda_1$ or $\lambda_2$ and framing signal to another signal line of the output line 356 or 358. Alternatively, when use is made of the overhead access function, the interpretation 178 may send three different signals, i.e., the decimal wavelength data, an FP indicative of the position of the byte D1 heading D bytes, and a clock signal synchronous with the decimal wavelength data and FP to the administrative byte detection 162 via preselected different lines.

The demultiplexing 180 demultiplexes the STM-1 frame signal applied to its input 352 into the previously mentioned three signals 462–466 or 468–472.

In the illustrative embodiment, the administrative byte detections 162 each has two circuit sections respectively assigned t o the associated two multiplexers 20 or 26. If three multiplexers are present, then each detection 162 will include three circuit sections. The crux is that the number of circuit sections of the detection 162 be equal to the number of multiplexers.

The operation of the system shown in FIGS. 1A–1D will be described hereinafter. At the transmitting station 1, the multiplexing 150 of the multiplexer #1 multiplexes the three STM-0 frame signals 450–454 and feeds the resulting multiplex high-speed signal or STM-1 frame signal to the administrative byte insertion 158. Likewise, the multiplexer #2 multiplexes the three STM-0 frame signals 456–460 and feeds the resulting multiplex high-speed signal or STM-1 frame signal to the administrative byte insertion 158. In the multiplexer #1, the wavelength value generation 154 generates wavelength data representative of the wavelength $\lambda_1$ and implemented by a decimal number and feeds it to the administrative byte generation 156. In response, the generation 156 delivers the above decimal wavelength data to the administrative byte insertion 158, and delivers the same wavelength data to the administrative byte detection 162 via the signal line 332. The insertion 158 multiplexes the decimal $\lambda_1$ wavelength data existing at the positions of the bytes D1 and D2 of the high-speed signal, and feeds the multiplex signal to the electrooptical transduction 160. The transduction 160 transforms the input electric high-speed signal to a high-speed optical signal having the wavelength $\lambda_1$. The optical signal is sent from the transduction 160 to the optical multiplexing 102 of the wavelength multiplexer 22 via the optical fiber 302.

The multiplexer #2 (20) operates in the same manner as the multiplexer #1 (20) except that it deals with the wavelength $\lambda_2$ and sends a high-speed optical signal having the wavelength $\lambda_2$ to the optical multiplexing 102 of the wavelength multiplexer 22 via the optical fiber 304.

The optical multiplexing 102 multiplexes the $\lambda_1$ and $\lambda_2$ high-speed optical signals input via the optical fibers 302 and 304, respectively, and feeds the resulting multiplex signal to the amplification 112. On the other hand, the administrative byte detection 162 detects the wavelength data $\lambda_1$ and $\lambda_2$ input via the signal lines 332 and 340, respectively, and delivers them to the wavelength counting 164. The wavelength counting 164 counts the different wavelengths represented by the wavelength data and feeds its count ("2" in the illustrative embodiment) to the light source control 106. The light source control 106 produces a control signal based on the count and delivers it to the exciting light source 110. The exciting light source 110 feeds to the amplification 112 an exciting optical signal whose intensity is determined by the above control signal. The amplification 112 combines the high-speed optical signal and exciting optical signal input from the multiplexing 102 and light source 110, respectively. Subsequently, the amplification 112 amplifies signal light contained in the combined optical signal to a preselected level and sends the amplified optical signal to the amplification 112 of the receiving station 2 via the optical fiber 314.

At the receiving station 2, the amplification 112 combines the highs-speed optical signal attenuated by the optical fiber 314 and an exciting optical signal output from the exciting light source 110 which will be described. Then, the amplification 112 amplifies signal light contained in the combined optical signal to a preselected level and feeds the amplified optical signal to the optical demultiplexing 122. The optical demultiplexing 122 demultiplexes the input high-speed optical signal into the high-speed optical signals having the wavelengths $\lambda_1$ and $\lambda_2$, respectively. The $\lambda_1$ signal and $\lambda_2$ signal are input to the photoelectric transductions 174 of the multiplexers #1 and #2 (26), respectively.

In the multiplexer #1 (26), the photoelectric transduction 174 transforms the $\lambda_1$ high-speed optical signal to an electric signal and feeds the electric signal to the administrative byte separation 176. The separation 176 separates the decimal $\lambda_1$ wavelength data existing at the positions of the bytes D1 and D2 of the input high-speed signal and delivers the separated wavelength data to the administrative byte interpretation 178. At the same time, the separation 176 feeds the high-speed signal to the demultiplexing 180. The demultiplexing 180 demultiplexes the input high-speed signal into three low-speed optical signals 462–466. The interpretation 178 transfers the decimal $\lambda_1$ wavelength data to the administrative byte detection 162 of the wavelength multiplexer 24 via the signal line 356.

The multiplexer #2 (26) operates in the same manner as the multiplexer #1 (26) except that it deals with the input high-speed signal having the wavelength $\lambda_2$, demultiplexes the resulting high-speed signal into three low-speed signals 468–472, and delivers the $\lambda_2$ wavelength data to the administrative byte detection 162 via the signal line 358.

The administrative byte detection 162 of the receiving station 2 detects the wavelength data $\lambda_1$ and $\lambda_2$ input via the signal lines 356 and 358, respectively, and delivers them to the wavelength counting 164. The wavelength counting 164 counts the different wavelengths represented by the wavelength data and feeds its count ("2" in the illustrative embodiment) to the light source control 106. The light source control 106 produces a control signal based on the count and delivers it to the exciting light source 110. The exciting light source 110 feeds to the amplification 112 an exciting optical signal whose intensity is determined by the above control signal. This exciting optical signal is applied to the amplification 112 mentioned earlier.

As stated above, in the illustrative embodiment, the wavelength multiplexer 22 of the transmitting station 1 multiplexes the high-speed optical signals having the wavelengths $\lambda_1$ and $\lambda_2$ respectively input from the multiplexers #1 and #2, counts the different wavelengths on the basis of the $\lambda_1$ and $\lambda_2$ wavelength data respectively input from the multiplexers #1 and #2, amplifies the combined high-seed signal to a preselected level with an exciting optical signal based on the count, and sends the amplified high-speed signal to the wavelength multiplexer 24 of the receiving station 2. Therefore, the optical output level control device of the transmitting station 1 is capable of automatically determining the number of different wavelengths and thereby maintaining the optical output the wavelength multiplexer 22 at a preselected constant level. This is also true with the optical output level control device included in the receiving station 2, as will be understood by analogy.

Even when the wavelength multiplexer 22 multiplexes three or more wavelengths, the optical output level control device is, of course, capable of automatically determining the number of wavelengths only if the administrative byte generating circuits of additional multiplexers are also connected to the administrative byte detection 162. The optical output of the wavelength multiplexer 22 can therefore be maintained at a preselected constant level. This is also true with the wavelength multiplexer 24 of the receiving station 2. In this manner, the illustrative embodiment is capable of coping with an increase or a decrease in the number of wavelengths.

Second Embodiment

Figure 3A:
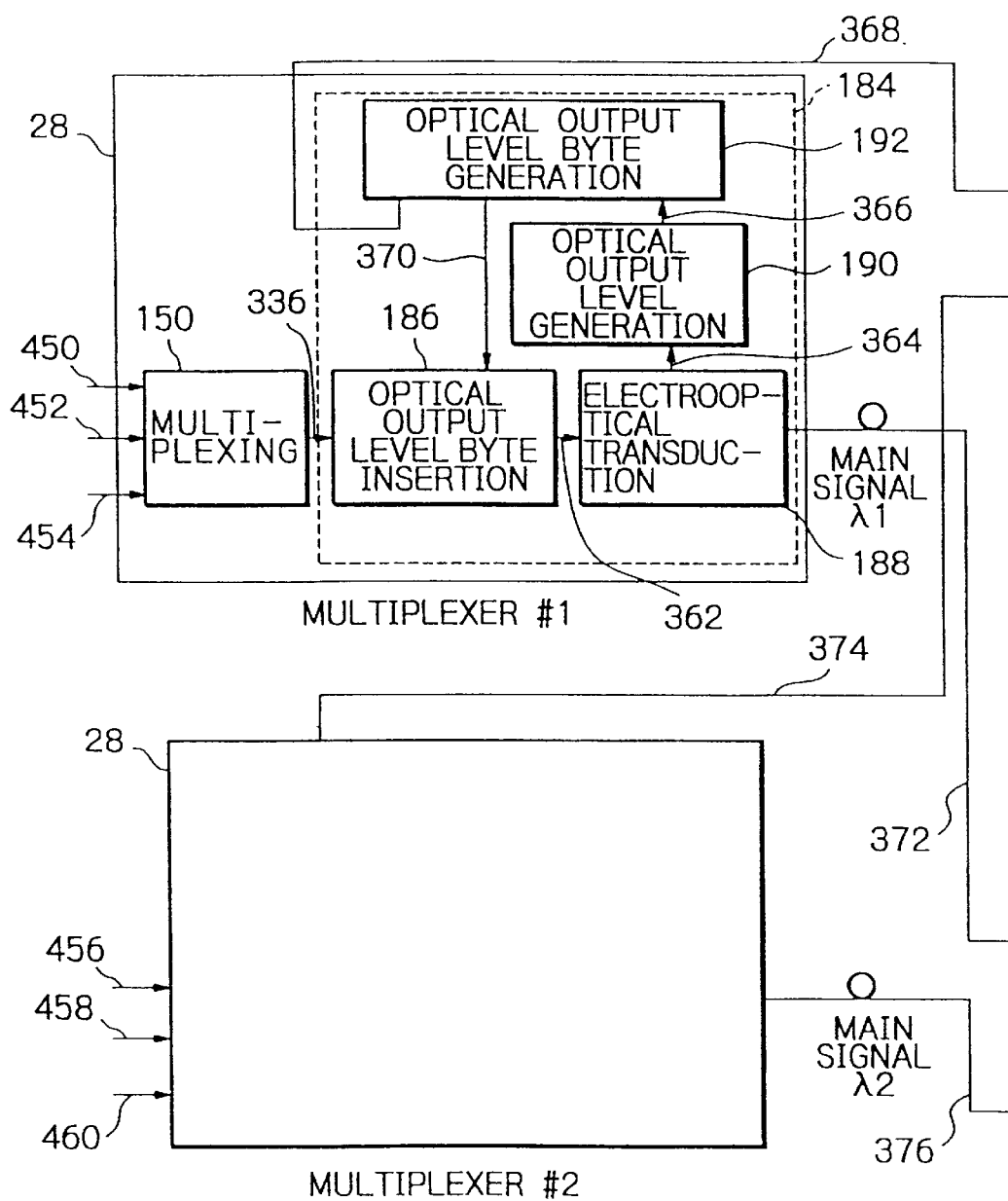
FIGS. 3A and 3B are combined.
Figure 3B:
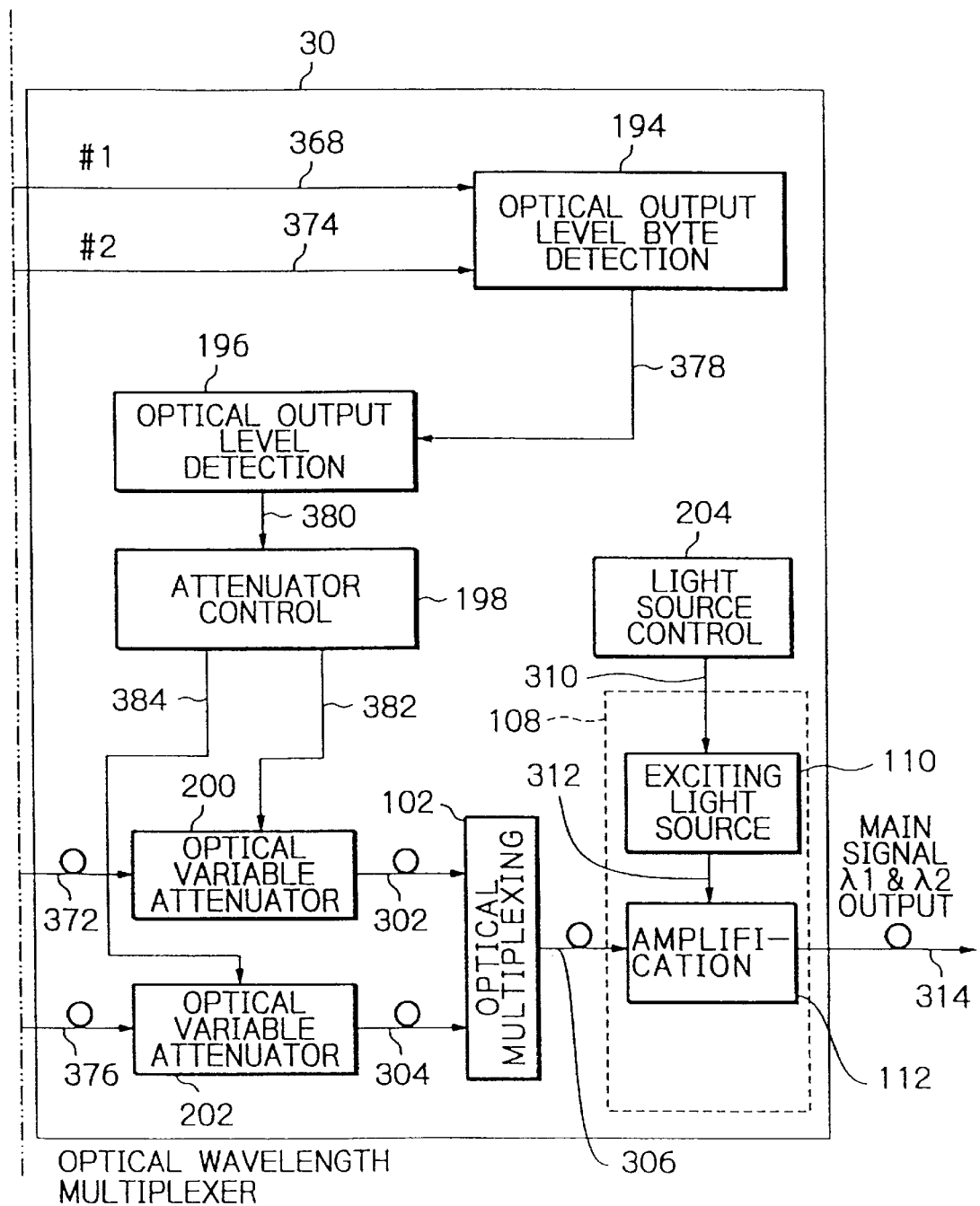

A second embodiment of the present invention will be described with reference to FIGS. 3A and 3B. FIGS. 3A and 3B show a transmitting station included in an optical transmission system. As shown, the transmitting station has two multiplexers (#1 and #2) 28 and an optical wavelength multiplexer 30 each constituting a transmitting section. The multiplexer #1 is connected to the wavelength multiplexer 30 by a signal line 368 and an optical fiber 372. Likewise, the multiplexer #2 is connected to the wavelength multiplexer 30 by a signal line 374 and an optical fiber 376.

The multiplexer #1 multiplexes three low-speed optical signals 450, 452 and 454 to thereby output a multiplex high-speed signal. Further, the multiplexer #1 multiplexes digital data representative of its own optical output level with the above high-speed signal, thereby outputting a high-speed optical signal having the wavelength $\lambda_1$. The digital data is implemented by a binary number or a decimal number. The high-speed optical signal is fed from the multiplexer #1 to the wavelength multiplexer 30 via the optical fiber 372. At the same time, the digital data representative of the optical output level is delivered from the multiplexer #1 to the wavelength multiplexer 30 via the signal line 368. Likewise, the multiplexer #2 multiplexes three low-speed optical signals 456, 458 and 460 to thereby output a multiplex high-speed signal. Further, the multiplexer #2 multiplexes digital data representative of its own optical output level with the high-speed signal, thereby outputting a high-speed optical signal having the wavelength $\lambda_2$. The digital data is also implemented by a binary number or a decimal number. The high-speed optical signal is fed from the multiplexer #2 to the wavelength multiplexer 30 via the optical fiber 376. At the same time, the digital data representative of the optical output level is delivered from the multiplexer #2 to the wavelength multiplexer 30 via the signal line 374.

The wavelength multiplexer 30 measures a difference in level between the digital data received via the signal lines 368 and 374 and generates, in the illustrative embodiment, two control signals based on the determined difference. The multiplexer 30 controls each of the two different high-speed optical signals respectively input via the optical fibers 372 and 376 with the respective control signal such that the optical signals have the same level. Then, the multiplexer 30 multiplexes the optical signals of the same level, amplifies the resulting multiplex optical signal to a preselected level with an exciting optical signal whose intensity is based on a preselected control signal, and sends the amplified optical signal via the optical fiber 314.

Specifically, the multiplexer #1 has a transmitting circuit 184 made up of an optical output level byte insertion 186, an electrooptical transduction 188, an optical output level generation 190 and an optical output level byte generation 192 as well as the multiplexing 150. The other multiplexer #1 is identical in configuration with the multiplexer #1 although not shown specifically. The wavelength multiplexer 30 has an optical output level byte detection 194, an optical output level detection 196, an attenuator control 198, optical variable attenuators 200 and 202 and a light source control 204 as well as the optical multiplexing 102 and the optical amplifier 108 made up of the exciting light source 110 and amplification 112.

In the illustrative embodiment, the optical output level control device is constituted by the transmission 184 of the multiplexer 28 and the optical output level byte detection 194, optical output level detection 196, attenuator control 198 and optical variable attenuators 200 and 202 of the waveform multiplexer 30. In FIGS. 3A and 3B, structural elements identical with the structural elements shown in FIGS. 1A, 1B, 12A and 12B are designated by identical reference numerals and will not be described specifically in order to avoid redundancy. The optical output level byte insertion 186 will be described in detail later. In the multiplexer 28, the optical output level byte insertion 186 multiplexes optical output level data of the optical output level byte generation 192 with the output signal of the multiplexing 150 and delivers the resulting multiplex signal to the input 362 of the electrooptical transduction 188. The transduction 188 includes a semiconductor laser having the wavelength $\lambda_1$ or $\lambda_2$, a laser driver for driving the laser, and an optical splitter for splitting an optical signal output from the laser into two optical signals. The signal applied to the input 362 is fed to the laser via the laser driver. The laser transforms the input signal to an optical intensity signal and feeds the optical intensity signal to the splitter. The splitter splits the optical intensity signal into two optical intensity signals. One of the split signals is fed to the optical output level generation 190 via an optical fiber 364 while the other signal is fed to the optical variable attenuator 200 or 202 via the optical fiber 372 or 376.

In the illustrative embodiment, to monitor the optical output level on the output 372 or 376 of the electrooptical transduction 188, use is made of an optical signal output from the output 364 of the transduction 188. Alternatively, a signal corresponding to the drive current value of the laser may be fed to the optical output level generation 190 via a signal line.

The optical output level generation 190 is implemented as an optical intensity detector and transforms an optical input level received via its input 364 to a corresponding electric signal level. The electric signal level is fed to the input of the output level byte generation 192 via the output 366 of the optical output level generation 190.

Figure 7:
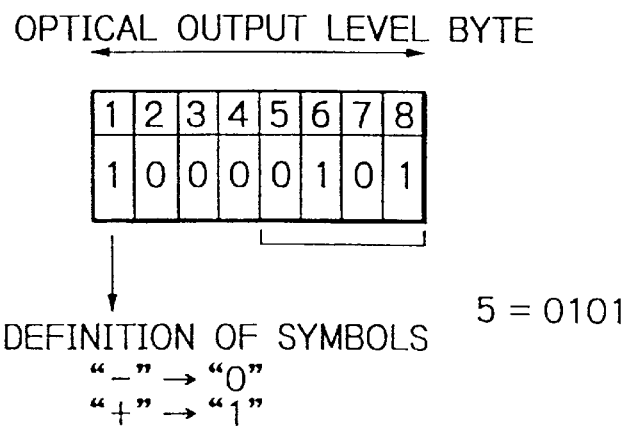
FIG. 7 demonstrates the operation of a specific optical output level byte generating circuit included in the second and third embodiments.

The output line 368 or 374 connected to the output of the optical output level byte generation 192 is made up of a plurality of signal lines. The generation 192 adds a preselected framing signal to the head of one byte of digital data (see FIG. 7) representative of the electric signal level input via the input 366, thereby producing a frame signal. The frame signal is output to preselected one of the above signal lines. At the same time, the generation 192 outputs a clock signal synchronous with the digital data and framing signal to another signal line. Further, the generation 192 delivers the digital data via its output 370. The output 370 is connected to a preselected input of the optical output level byte insertion 186.

In the illustrative embodiment, the optical output level byte generation 192 feeds to the optical output level byte detection 194 each of the frame signal consisting of the framing signal and digital data and the clock signal synchronous with the frame signal via a particular signal line. Alternatively, when use is made of the overhead access function, the generation 192 may send three different signals, i.e., one byte of digital data, an FP indicative of the position of the byte D1 heading D bytes, and a clock signal synchronous with the digital data and FP to the detection 194 via preselected different lines.

The multiplexing 150 delivers an STM-1 frame signal whose bytes D1–D3 are unused to the output level byte insertion 186. The optical output level byte generation 192 feeds one byte of digital data shown in FIG. 7 to the optical output level byte insertion 186 in synchronism with the byte D1 received from the multiplexing 150. As a result, an STM-1 frame signal with the digital data multiplexed at the position of the byte D1 appears on the output 362 of the insertion 186. The output 362 is connected to the electrooptical transduction 188. While the generation 192 is assumed to send preselected data to the insertion 186 in synchronism with the byte D1, it should only send the preselected data to the insertion 186 if use is made of the overhead access function. Also, the generation 192 may transform the optical output level to a decimal number in place of a binary number, if desired.

In the wavelength multiplexer 30, the optical output level byte detection 194 detects one byte of digital data received from the multiplexer #1 via the input 368 and one byte of digital data received from the multiplexer #2 via the input 374. The detection 194 delivers the detected digital data to the optical output level detection 196 via its output 378. The optical output level detection 196 counts the different digital data (two in the illustrative embodiment) received via its input 378 while counting the number of level differences and feeds the resulting counts to the attenuator control 198 via a signal line 380. The attenuator control 198 generates two different control signals based on the level difference and produces them on its outputs 382 and 384. The outputs 382 and 384 are respectively connected to the optical variable attenuators 200 and 202.

Figure 9A:
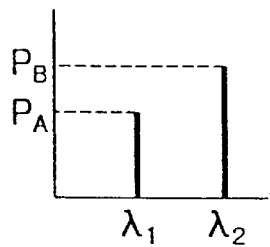
FIGS. 9A, 9B and 9C show the operation of a specific optical wavelength multiplexer included in the second embodiment.
Figure 9B:
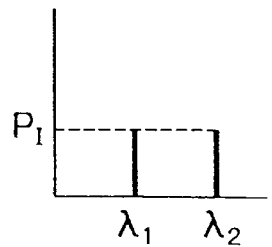

The optical variable attenuators 200 and 202 each rotates a respective attenuating device in accordance with the control signal input via its input 382 or 384. In the illustrative embodiment, the attenuating device is implemented by a film formed by vapor deposition and continuously varied in thickness in correspondence to rotation angles. The attenuator 200 therefore attenuates the optical level input via the input 372 in accordance with the control signal input via the input 382 and produces the attenuated optical level on its output 302. Likewise, the attenuator 202 attenuates the optical level input via the input 376 in accordance with the control signal input via the input 384 and produces the attenuated optical level on its output 304. As a result, the optical levels appearing on the outputs 302 and 304 have the same level (see FIG. 9B). If desired, the film thickness continuously varying in correspondence to rotation angles may be replaced with an attenuation amount varying stepwise in correspondence to rotation angles.

Figure 9C:
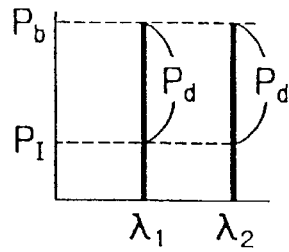

The light source control 204 produces on its output 310 a control signal implementing an amplification degree of Pα dB by way of example. In this case, the amplification 112 outputs optical signals having specific levels shown in FIG. 9C.

In operation, the multiplexing 150 included in each of the multiplexers #1 and #2 (28) multiplexes the three signals (STM-0 frame signals) 450–454 or 456–460 input thereto and feeds the resulting high-speed signal (STM-1 frame signal) to the optical output level byte insertion 186. In the multiplexer #1, the optical output level generation 190 generates an electric signal level corresponding to an optical output level output from the electrooptical transduction 188 and feeds it to the optical level byte generation 192. The generation 192 transforms the input electric signal level to corresponding digital data implemented by a binary number and delivers the digital data to the optical output level byte insertion 186. At the same time, the generation 192 sends the digital data or binary number to the optical output level byte detection 194 of the wavelength multiplexer 30 via the signal line 368. The insertion 186 multiplexes the input digital data with the input high-speed signal at the position of the byte D1 and feeds the resulting multiplex signal to the electrooptical transduction 188. The transduction 188 converts the electric high-speed signal to an optical high speed signal having the wavelength $\lambda_1$ and sends the optical high speed signal to the optical variable attenuator 200 of the wavelength multiplexer 30 via the optical fiber 372.

The optical output level generation 190 of the multiplexer #2, although not shown specifically, also generates an electric signal level corresponding to an optical output level output from the associated electrooptical transduction 188 and feeds it to the associated optical output level byte generation 192. The generation 192 transforms the electric signal level to corresponding digital data or binary number and delivers the digital data to the optical output level byte insertion 186. At the same time, the generation 192 sends the digital data to the optical output level byte detection 194 via the signal line 374. The optical output level byte insertion 186 and electrooptical transduction 188 operate in exactly the same manner as the insertion 186 and transduction 188 of the multiplexer #1 except that the high-speed optical signal output from the transduction 188 has the wavelength $\lambda_2$.

In the wavelength multiplexer 30, the optical output level byte detection 194 detects the digital data respectively received via the signal lines 368 and 374 and transfers them to the optical output level detection 196. The detection 196 measures a difference in level between the two different digital data and feeds the difference to the attenuator control 198. The attenuator control 198 generates control signals 382 and 384 based on the above difference and feeds the signals 382 and 384 to the optical variable attenuators 200 and 202, respectively. The attenuator 200 controls the level of the $\lambda_1$ high-speed optical signal input via the optical fiber 372 in accordance with the control signal 382 and produces the controlled signal on its output 302. Likewise, the attenuator 202 controls the level of the $\lambda_2$ high-speed optical signal input via the optical fiber 376 in accordance with the control signal 384 and produces the controlled signal on its output 304. Consequently, the outputs 302 and 304 have the same level.

The high-speed optical signals of the same level are multiplexed by the optical multiplexing 102 and then applied to the amplification 112. The light source control 204 delivers a preselected control signal to the exciting light source 110 which, in turn, feeds an exciting optical signal with intensity matching with the control signal to the amplification 112. The amplification 102 combines the multiplex high-speed optical signal and exciting optical signal respectively input from the multiplexing 102 and light source 110, amplifies only the signal light of the combined signal, and produces the signal light on its output 314.

As stated above, even when the optical output powers output from the multiplexers #1 and #2 are different in level, the illustrative embodiment allows the wavelength multiplexer 30 to produce optical outputs of the same preselected level without fail.

Figure 8A:
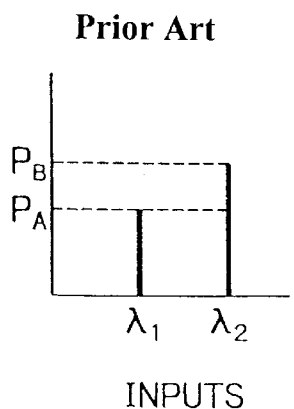
FIGS. 8A and 8B show the operation of a specific conventional optical wavelength multiplexer.
Figure 8B:
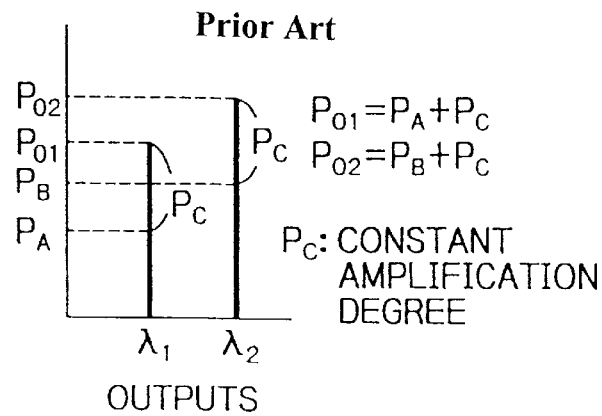

The conventional scheme for coping with a difference in level has the problems discussed earlier with reference to FIG. 8. In the second embodiment, the wavelength multiplexer 30 receives optical output level bytes from the multiplexers 28 for thereby monitoring the optical power output from each multiplexer 28. This makes it needless to allocate particular devices to each of the different wavelengths and thereby simplifies the circuit arrangement and reduces the number of parts.

Figure 4A:
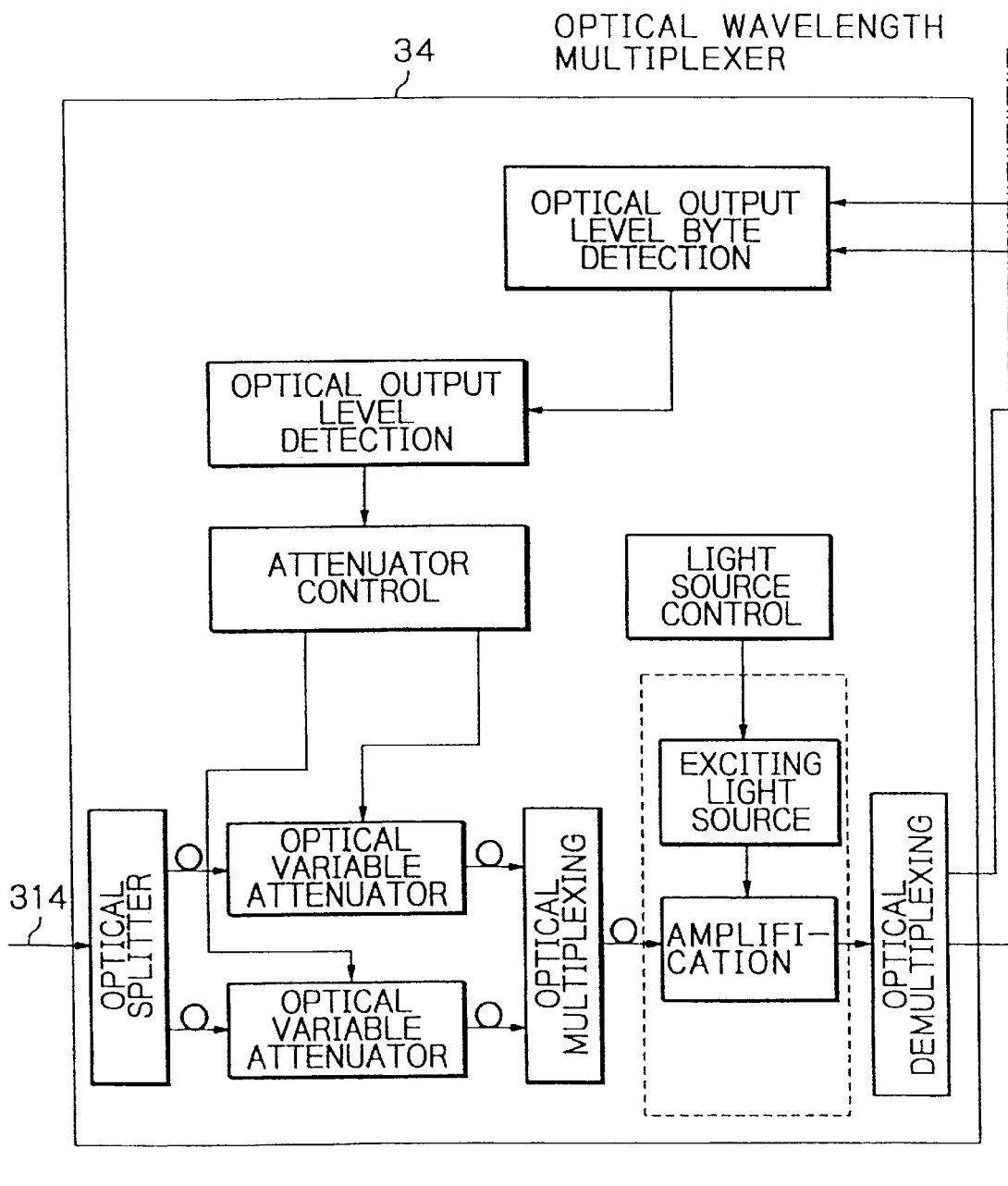
FIGS. 4A and 4B are combined.
Figure 4B:
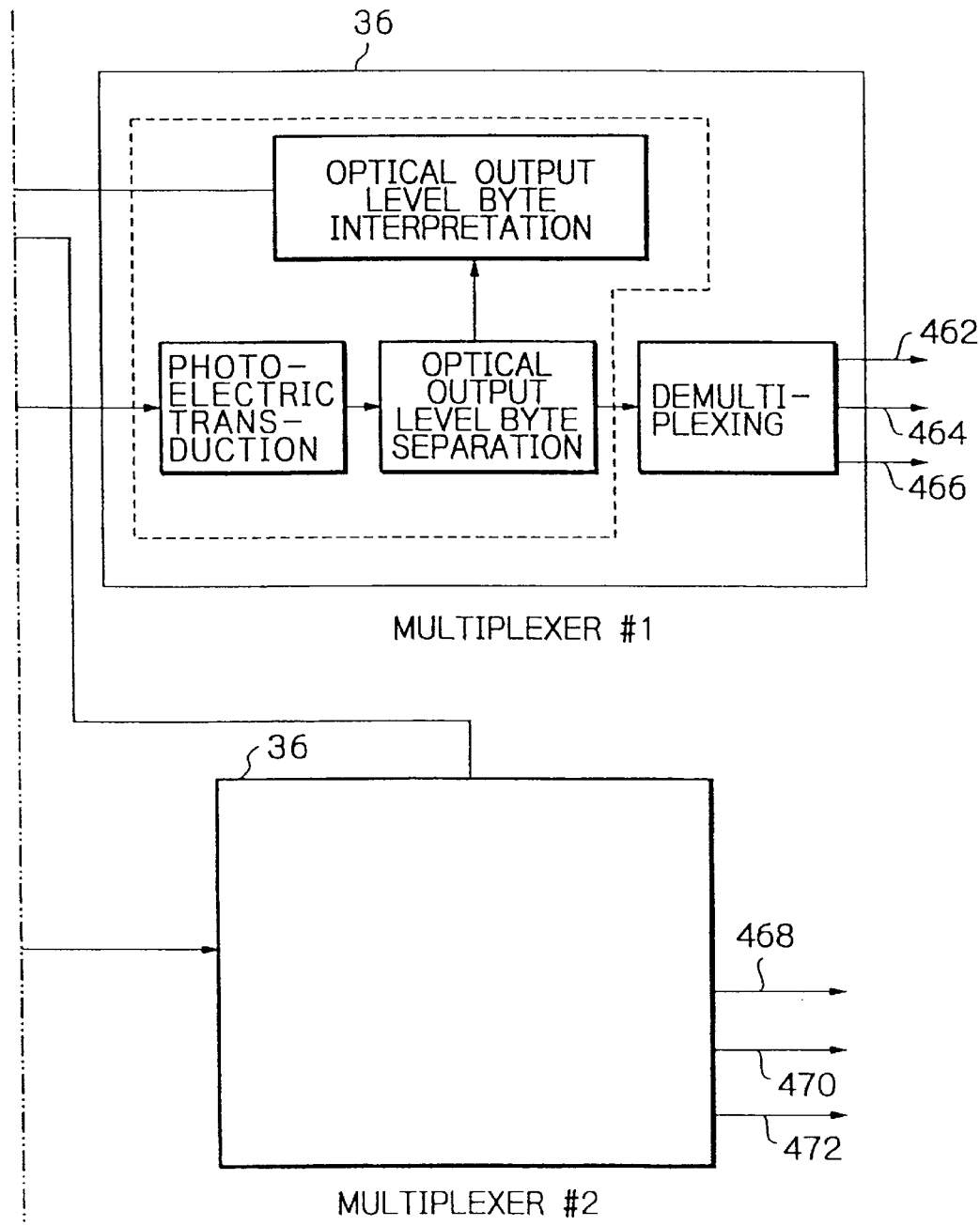

FIGS. 4A and 4B show a receiving station included in the optical transmission system together with the transmitting station described with reference to FIGS. 3A and 3B. The construction and operation of the receiving station will be readily understood from the description relating to FIGS. 1A–1D, 3A and 3B and will not be described specifically.

Third Embodiment

Figure 5B:
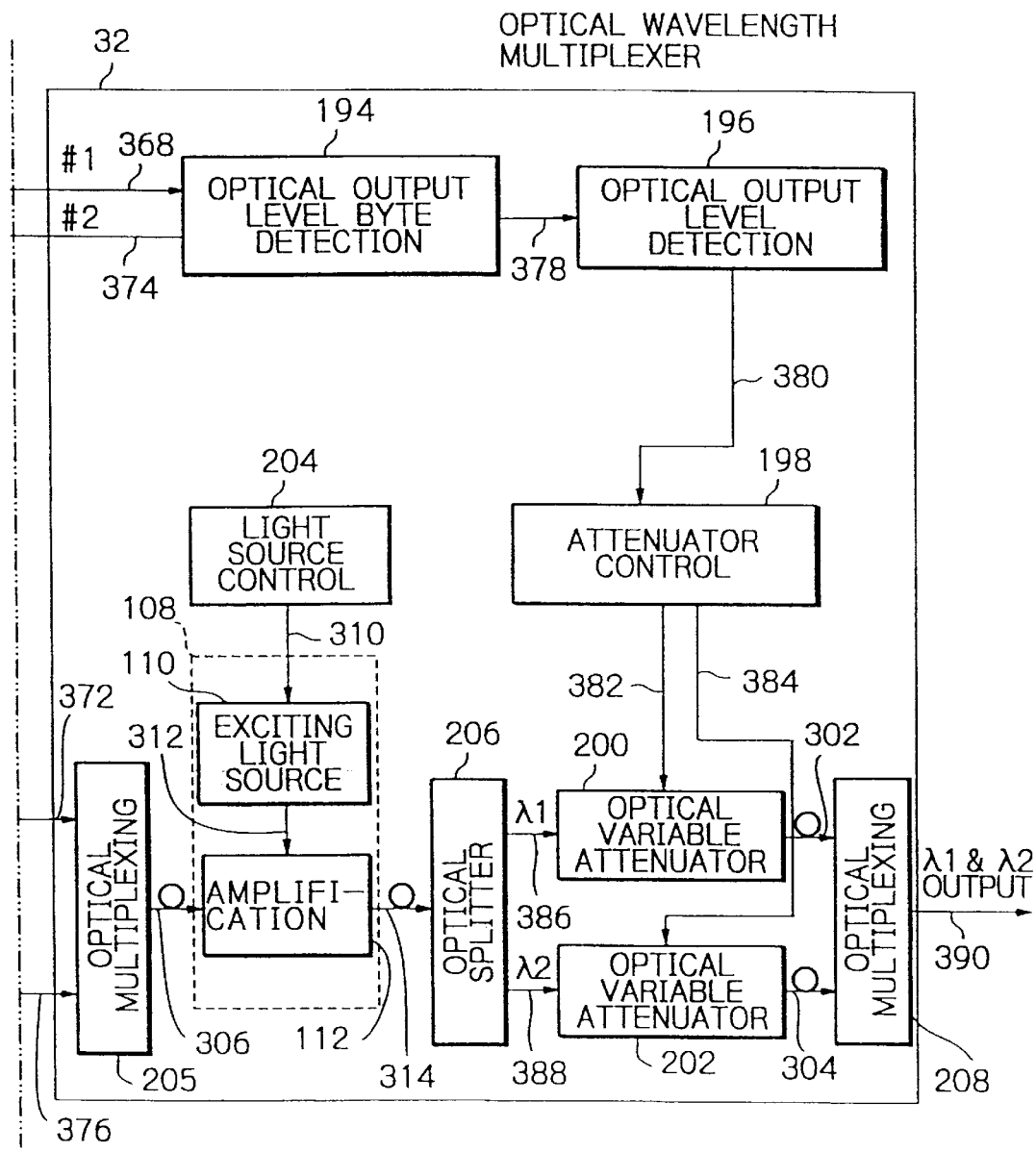

Referring to FIGS. 5A and 5B, a third embodiment of the present invention will be described. FIGS. 5A and 5B show a transmitting station included in an optical transmission system. As shown, the transmitting station has two multiplexers (#1 and #2) 28 and a wavelength multiplexer 32 each constituting a transmitting section. While the multiplexers 28 are identical in construction and operation with the multiplexers 28 of the second embodiment, the wavelength multiplexer 32 differs from the wavelength multiplexer 30 in the following respects. As shown in FIG. 5B, a optical multiplexing 205 and circuitry following it are arranged at the preceding stage of the wavelength multiplexer 32. An optical splitter 206 is connected to the output 314 of the optical amplifier 108 following the optical multiplexing 205. The optical variable attenuators 200 and 202 and attenuator control 198 follow the optical splitter 206. Another optical multiplexing 208 follows the attenuators 200 and 202.

Basically, the optical output level control device of the illustrative embodiment is also constituted by the transmission 184 of each multiplexer 28 and the optical output level byte detection 194, optical output level detection 196, attenuator control 198 and optical variable attenuators 200 and 202 of the wavelength multiplexer 32. In FIGS. 5A and 5B, structural elements identical with the structural elements shown in FIGS. 1A, 1B, 3A, 3B, 12A and 12B are designated by identical reference numerals and will not be described specifically in order to avoid redundancy. The optical multiplexings 205 and 208 each is basically identical with the optical multiplexing 102 and will not be described. Also, the optical splitter 206 is basically identical with the optical demultiplexing 122 and will not be described.

The operation of the third embodiment is as follows. In the multiplexer #1 (28), the optical output level byte generation 192 sends digital data corresponding to the optical output level of the multiplexer #1 and implemented by a binary number to the optical output level byte detection 194 of the wavelength multiplexer 32 via the signal line 368, as in the second embodiment. The electrooptical transduction 188 sends to the optical multiplexing 205 a $\lambda_1$ high-speed optical signal with the digital data multiplexed at the position of the byte D1 via the optical fiber 372. The multiplexer #2 operates in the same manner as the multiplexer #1 (28) except that it sends digital data or binary number representative of its own optical output level to the optical output level byte detection 194 via the signal line 374 and sends a $\lambda_2$ high-speed optical signal with the digital data multiplexed at the position of the byte D1 to the optical multiplexing 205 via the optical fiber 376.

Figure 10A:
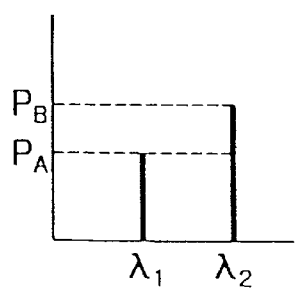
FIGS. 10A, 10B and 10C show the operation of a specific optical wavelength multiplexer included in the third embodiment.
Figure 10B:
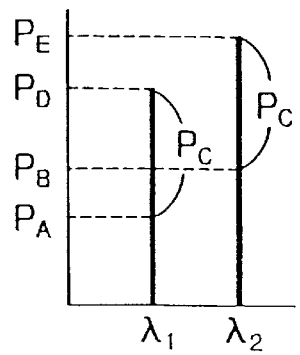

The optical multiplexing 205 multiplexes the input high-speed optical signals 372 and 376 and feeds the multiplexed signal to the amplification 112. The light source control 204 feeds a preselected control signal to the exciting light source 110. In response, the light source 110 delivers an exciting optical signal having intensity determined by the control signal to the amplification 112. The amplification 112 combines the optical signals respectively received from the multiplexing 205 and light source 110, amplifies signal light contained in the combined optical signal, and feeds the amplified optical signal to the optical splitter 206 (see FIG. 10B). The splitter 206 splits the input optical signal on a wavelength basis and feeds the resulting $\lambda_1$ high-speed optical signal and $\lambda_2$ high-speed optical signal to the variable attenuators 200 and 202, respectively.

Figure 10C:
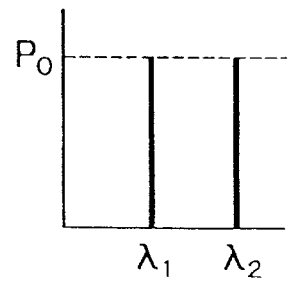

On the other hand, the optical output level byte detection 194 detects the digital data input via the signal lines 368 and 374 and transfers them to the optical output level detection 196. The detection 196 measures a difference in level between the two different digital data and delivers the difference to the attenuator control 198. The attenuator control 198 feeds control signals 382 and 384 based on the above difference to the variable attenuators 200 and 202, respectively. The attenuator 200 controls the level of the $\lambda_1$ high-speed optical signal input via the optical fiber 372 in accordance with the control signal 382 and produces the controlled signal on its output 302. Likewise, the attenuator 202 controls the level of the $\lambda_2$ high-speed optical signal input via the optical fiber 376 in accordance with the control signal 384 and produces the controlled signal on its output 304. Consequently, the outputs 302 and 304 have the same level (see FIG. 10C).

The high-speed optical signals of the same level are multiplexed by the optical multiplexing 208 and then delivered via the output 390.

As stated above, even when the optical output powers output from the multiplexers #1 and #2 are different in level, the illustrative embodiment, like the second embodiment, allows the wavelength multiplexer 32 to produce optical outputs of the same preselected level without fail. Also, in the third embodiment, the wavelength multiplexer 32 receives optical output level bytes from the multiplexers 28 for thereby monitoring the optical power output from each multiplexer 28. This also makes it needless to allocate particular devices to each of the different wavelengths and thereby simplifies the circuit arrangement and reduces the number of parts.

Figure 6A:
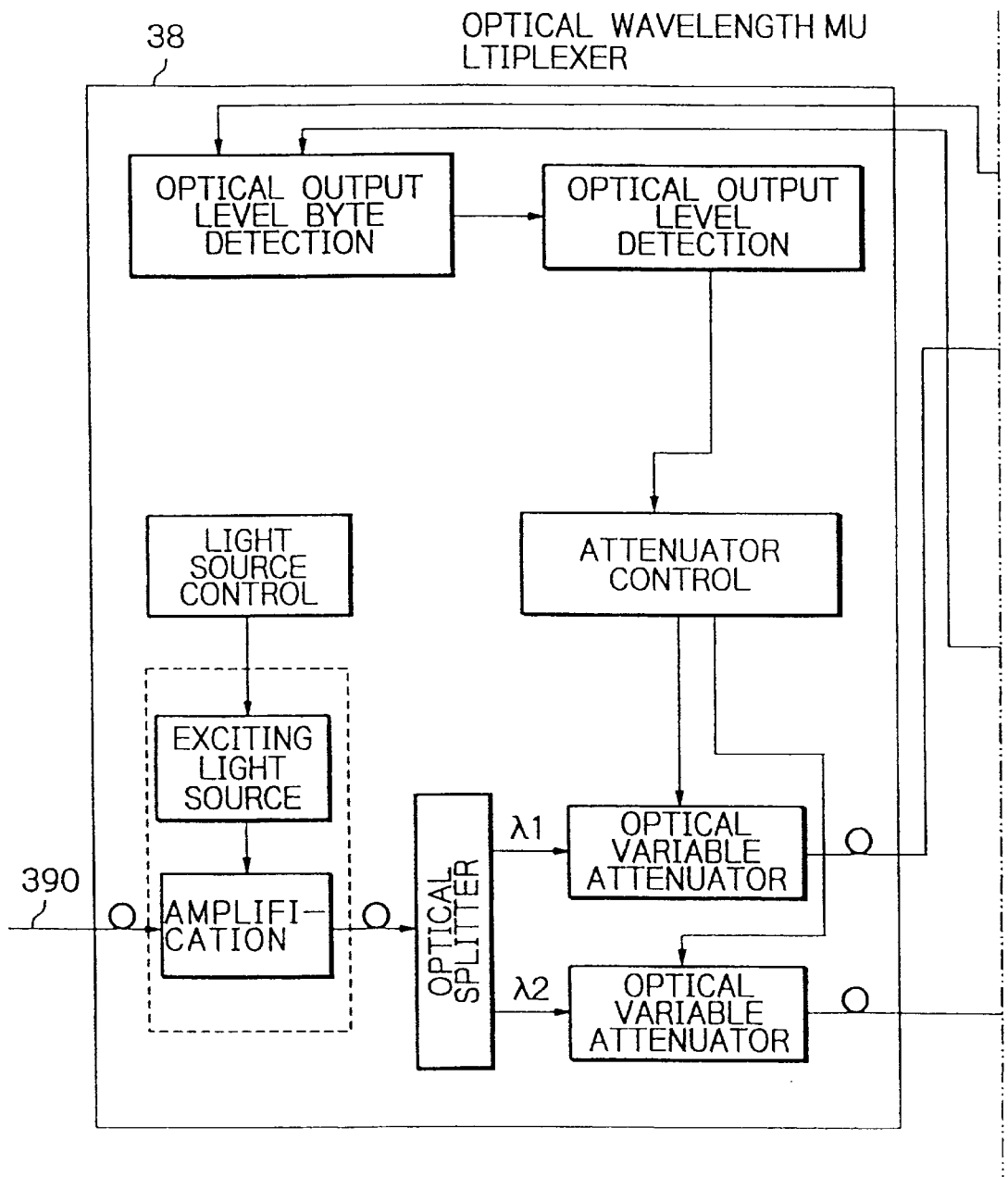

FIGS. 6A and 6B show a receiving station included in the optical transmission system together with the transmitting station described with reference to FIGS. 5A and 5B. The construction and operation of the receiving station will be readily understood from the description relating to FIGS. 1A–1D and 5A and 5B and will not be described specifically.

Fourth Embodiment

Figure 11B:
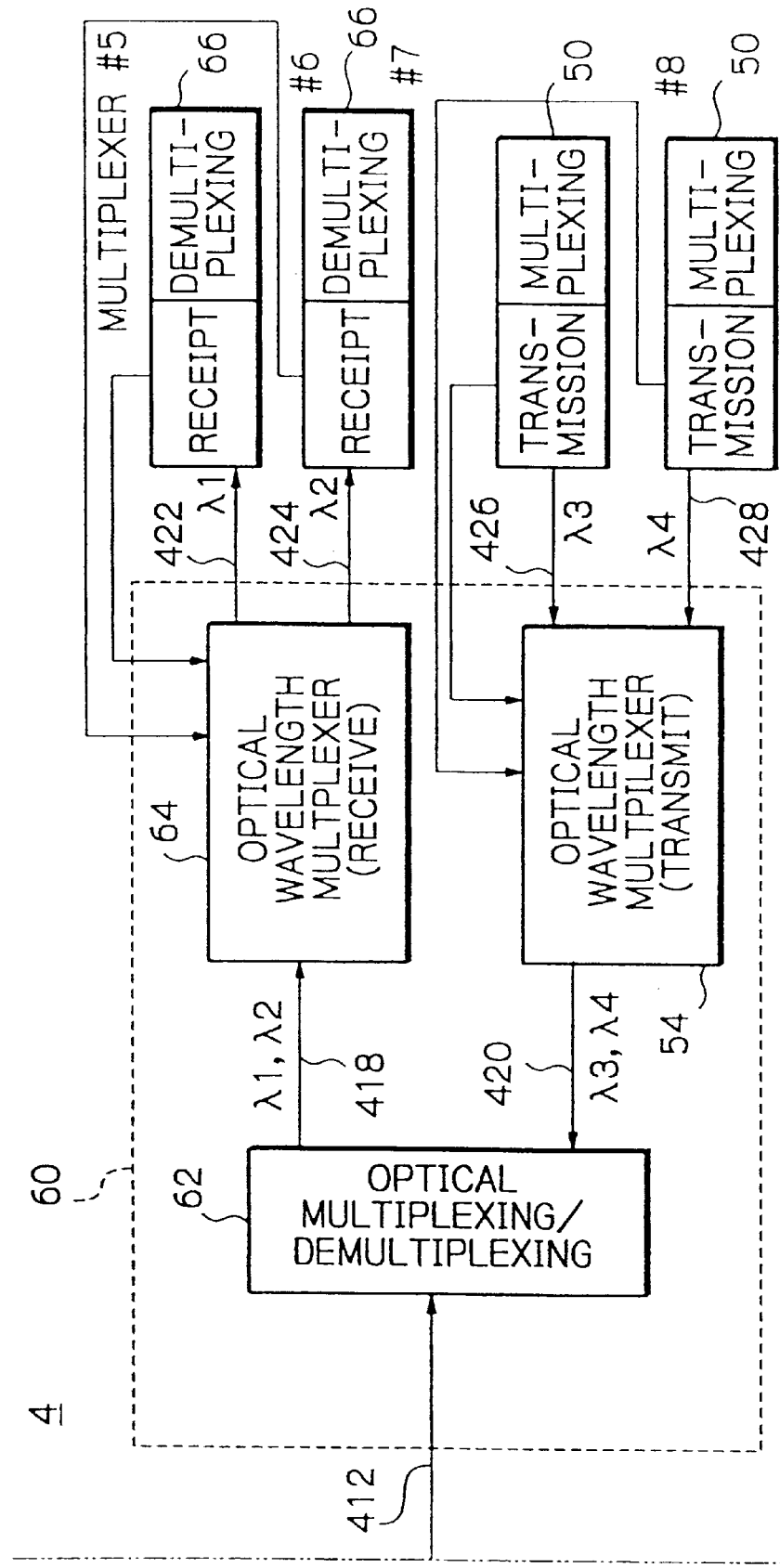

A fourth embodiment of the present invention will be described with reference to FIGS. 11A and 11B. As shown, this embodiment is implemented as a bidirectional optical transmission system including two transmitting/receiving stations 3 and 4. The transmitting/receiving station 3 has two multiplexers (#1 and #2) 50 each constituting a transmitting section, two multiplexers (#3 and #4) 66 each constituting a receiving section, an optical wavelength multiplexer 54 constituting a transmitting section, an optical wavelength multiplexer 64 constituting a receiving section, an optical multiplexing/demultiplexing 56, and a maintenance terminal or network administration unit 58. The other transmitting/receiving station 4 has an optical multiplexing/demultiplexing 62, an optical wavelength multiplexer 64 constituting a receiving section, two multiplexers (#5 and #6) 66 each constituting a receiving section, two multiplexers 50 (#7 and #8) each constituting a transmitting section, and an optical wavelength multiplexer 54 constituting a transmitting section. This embodiment is characterized by the maintenance terminal or network administration unit 58 connected to the transmitting/receiving station 3.

At the station 3 shown in FIG. 11A, the wavelength multiplexers 54 and 64 and optical multiplexing/demultiplexing 56 constitute bidirectional wavelength multiplexing circuitry 52. Likewise, at the station 4, the optical multiplexing/demultiplexing 62 and wavelength multiplexers 64 and 54 constitute bidirectional wavelength multiplexing circuitry 60.

Specifically, the multiplexer #1 (50) of the station 3 is connected to the multiplexer #5 (66) via an optical fiber 400, the wavelength multiplexer 54, an optical fiber 408, the optical multiplexing/demultiplexing 56, an optical fiber 412, the optical multiplexing/demultiplexing 62, an optical fiber 418, the wavelength multiplexer 64, and an optical fiber 422. The multiplexer #2 (50) is connected to the multiplexer #6 (66) via an optical fiber 402, the wavelength multiplexer 54, the optical fiber 408, the optical multiplexer/demultiplexer 56, the optical fiber 412, the optical multiplexing/demultiplexing 62, the optical fiber 418, the wavelength multiplexer 64, and an optical fiber 424.

Likewise, the multiplexer #7 (50) of the station 4 is connected to the multiplexer #3 (66) via an optical fiber 426, the wavelength multiplexer 54, an optical fiber 420, the optical multiplexing/demultiplexing 62, the optical fiber 412, the optical multiplexing/demultiplexing 56, an optical fiber 410, the wavelength multiplexer 64, and an optical fiber 404. The multiplexer #8 (50) is connected to the multiplexer #4 (66) via an optical fiber 428, the wavelength multiplexer 54, the optical fiber 420, the optical multiplexing/demultiplexing 62, the optical fiber 412, the optical multiplexing/demultiplexing 56, the optical fiber 410, the wavelength multiplexer 64, and an optical fiber 406.

The multiplexers 50 and multiplexers 66 may be identical in configuration with the multiplexers 20 or 28 and multiplexers 26 or 36 connected to the multiplexers 20 or 28, respectively. Also, the wavelength multiplexers 54 may be identical in configuration with the wavelength multiplexer 22, 30 or 32 connected to the multiplexers 20 or 28. Further, the wavelength multiplexers 64 20 may be identical in configuration with the wavelength multiplexers 24 or 38 connected to the wavelength multiplexers 22, 30 or 32, respectively.

The optical multiplexing/demultiplexing 56 is implemented by an optical splitter/combiner. The multiplexing/demultiplexing 56 outputs multiplexed $\lambda_1$ and $\lambda_2$ optical signals input via the input 408 on its input/output 412, and outputs multiplexed $\lambda_3$ and $\lambda_4$ optical signals input via the input/output 412 on its output 410.

The optical multiplexing/demultiplexing 62 is identical with the multiplexing/demultiplexing 56 except that it outputs multiplexed $\lambda_1$ and $\lambda_2$ optical. signals input via its input/output 412 on its output 418 and outputs multiplexed $A_3$ and $A_4$ optical signals input via its input 420 on its input/output 412.

The maintenance terminal or network administration unit 58 is connected to the wavelength multiplexers 54 and 64 by signal lines 414 and 416, respectively. Specifically, the signal line 414 may be connected to, in the case of the wavelength multiplexer 22, the inputs 332 and 340 or the output 342 of the wavelength administrative byte detection 162 or to, in the case of the wavelength multiplexer 30 or 32, the inputs 368 and 374 or the output 378 of the optical output level byte detection 194, The other signal line 416 may be connected to, in the case of the wavelength multiplexer 24, the inputs 356 and 358 or the output 342 of the wavelength administrative byte detection 162 or to, in the case of the waveform multiplexer 34 or 38, the two inputs or the output of the optical output level byte detection.

With the above configuration, the maintenance terminal 58 is capable of displaying the number of received wavelengths, wavelength values, optical output levels and other information on a monitor included in the terminal 58. This allows the entire system to be monitored and and adequately controlled.

While the embodiments shown and described each multiplexes data in the positions of the bytes D1–D3, the data may be multiplexed in any other suitable positions. Further, the STM-1 frame signals described in relation to the illustrative embodiments may be replaced with STM-4, STM-16, STM-64 or similar frame signals, if desired.

In summary, it will be seen that the present invention provides an optical output level control device for an optical wavelength multiplexer having the following various unprecedented advantages. The control device is capable of automatically determining the number of different wavelengths and thereby controlling the optical output of a first or a second wavelength multiplexer situated at a transmitting or a receiving station, respectively, to a preselected constant level. This is true even when the number of wavelengths to be applied to the wavelength multiplexer is varied.

A first or second network administration unit is capable of displaying the number of wavelengths, wavelength values a n d other information input thereto on a monitor. This allows the conditions of the entire optical transmission system to be monitored and adequately controlled.

Further, even when the optical output powers of a first and a second multiplexer are different in level from each other, the optical output of the first or the second wavelength multiplexer can be controlled to a preselected necessary level. The waveform multiplexers are simple in construction because each of them monitors the associated multiplexers on the basis of optical output data each being representative of the optical output power of a particular multiplexer.

The entire disclosure of Japanese patent application No. 68651/1998 filed on Mar. 18, 1998 and including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. In an optical output control device for an optical wavelength multiplexer included in an optical transmission system including at least a first and a second multiplexer and a first optical wavelength multiplexer situated at a transmitting station, said first multiplexer comprising:

a first multiplexing circuit for transforming a plurality of preselected low-speed optical signals input thereto to corresponding electric signals, and multiplexing said electric signals to thereby output a first high-speed signal; and a first transmitting circuit for receiving the first high-speed signal from said first multiplexing circuit, generating first wavelength data representative of a wavelength of light output from said first multiplexer, inserting said first wavelength data at a preselected position of said first high-speed signal, and transforming said first high-speed signal with said first wavelength data to a first high-speed optical signal having a first wavelength;

said second multiplexer comprising:

a second multiplexing circuit for transforming a plurality of preselected low-speed optical signals input thereto to corresponding electric signals, and multiplexing said electric signals to thereby output a second high-speed signal; and a second transmitting circuit for receiving the second high-speed signal from said second multiplexing circuit, generating second wavelength data representative of a wavelength of light output from said second multiplexer, inserting said second wavelength data at a preselected position of said second high-speed signal, and transforming said second high-speed signal with said second wavelength data to a second high-speed optical signal having a second wavelength;

said first optical wavelength multiplexer comprising:
 a first wavelength multiplexing circuit for multiplexing the wavelength of the first high-speed optical signal and the wavelength of the second high-speed optical signal; and
 a first control light amplifying circuit for receiving a high-speed optical signal from said first wavelength multiplexing circuit, receiving the first wavelength data from said first transmitting circuit, receiving the second wavelength data from said second transmitting circuit, counting different wavelengths on the basis of said first wavelength data and said second wavelength data, and amplifying said high-speed optical signal with an exciting optical signal whose intensity is determined by a control signal based on a number of wavelengths counted.

2. A device in accordance with claim 1, wherein said first transmitting circuit comprises:
 a first wavelength value generating circuit for generating wavelength data in the form of either one of a decimal number and a binary number; and
 a first wavelength administrative byte generating circuit for outputting the wavelength data generated by said first wavelength value generating circuit as the first wavelength data;
 said first transmitting circuit outputting and inserting the first wavelength data;
 said second transmitting circuit comprising:
  a second wavelength value generating circuit for generating wavelength data in the form of either one of a decimal number and a binary number; and
  a second wavelength administrative byte generating circuit for outputting the wavelength data generated by said second wavelength value generating circuit as the second wavelength data;
  said second transmitting circuit outputting and inserting said second wavelength data.

3. A device in accordance with claim 1, wherein said first control light amplifying circuit comprises:
 a first wavelength administrative byte detecting circuit for receiving and then outputting the first wavelength data and the second wavelength data; and
 a first wavelength counting circuit for counting different wavelengths on the basis of the first wavelength data and the second wavelength data output from said first wavelength administrative byte detecting circuit, and outputting a control signal based on the number of different wavelengths counted.

4. A device in accordance with claim 3, wherein said optical transmission system further includes a first network administration unit for receiving the first wavelength data and the second wavelength data input to or output from said first wavelength administrative byte detecting circuit.

5. A device in accordance with claim 1, wherein a receiving station included in said optical transmission system includes at least a third and a fourth multiplexer and a second optical wavelength multiplexer, said second optical wavelength multiplexer comprising:
 a second control light amplifying circuit for receiving the first wavelength data and the second wavelength data separated, receiving the high-speed optical signal from said first control light amplifying circuit, counting different wavelengths on the basis of said first wavelength data and said second wavelength data, and amplifying said high-speed optical signal with an exciting optical signal whose intensity is determined by a control signal based on a number of different wavelengths counted; and
 an optical demultiplexing circuit for demultiplexing the high-speed optical signal input from said second control light amplifying circuit into high-speed optical signals respectively corresponding to said first wavelength data and said second wavelength data;
 said third multiplexer comprising a first receiving circuit for receiving the high-speed optical signal corresponding to the first wavelength data, transforming said high-speed optical signal to a corresponding electric signal, separating said first wavelength data from said electric signal, and feeding said first wavelength data to said second control light amplifying circuit;
 said fourth multiplexer comprising a second receiving circuit for receiving the high-speed optical signal corresponding to the second wavelength data, transforming said high-speed optical signal to a corresponding electric signal, separating said second wavelength data from said electric signal, and feeding said second wavelength data to said second control light amplifying circuit.

6. A device in accordance with claim 4, wherein a receiving station included in said optical transmission em includes at least a third and a fourth multiplexer and a second optical wavelength multiplexer, said second optical wavelength multiplexer comprising:
 a second control light amplifying circuit for receiving the first wavelength data and the second wavelength data separated, receiving the high-speed optical signal from said first control light amplifying circuit, counting different wavelengths on the basis of said first wavelength data and said second wavelength data, and amplifying said high-speed optical signal with an exciting optical signal whose intensity is determined by a control signal based on a number of different wavelengths counted; and
 an optical demultiplexing circuit for demultiplexing the high-speed optical signal input from said second control light amplifying circuit into high-speed optical signals respectively corresponding to said first wavelength data and said second wavelength data;
 said third multiplexer comprising a first receiving circuit for receiving the high-speed optical signal corresponding to the first wavelength data, transforming said high-speed optical signal to a corresponding electric signal, separating said first wavelength data from said electric signal, and feeding said first wavelength data to said second control light amplifying circuit;
 said fourth multiplexer comprising a second receiving circuit for receiving the high-speed optical signal corresponding to the second wavelength data, transforming said high-speed optical signal to a corresponding electric signal, separating said second wavelength data from said electric signal, and feeding said second wavelength data to said second control light amplifying circuit.

7. A device in accordance with claim 5, wherein said second control light amplifying circuit comprises: second wavelength administrative byte detecting circuit for receiving and then outputting the first wavelength data and the second wavelength data; and a second wavelength counting circuit for counting different wavelengths on the basis of the first wavelength data and the second wavelength data output from said second wavelength administrative byte detecting circuit, and outputting a control signal based on the number of different wavelengths counted.

8. A device in accordance with claim 7, wherein said optical transmission system further includes a second network administration unit for receiving the first wavelength data and the second wavelength data input to or output from said second wavelength administrative byte detecting circuit.

9. In an optical output control device for an optical wavelength multiplexer included in an optical transmission system including at least a first and a second multiplexer and a first optical wavelength multiplexer situated at a transmitting station, said first multiplexer comprising:

a first multiplexing circuit for transforming a plurality of preselected low-speed signals input thereto to corresponding electric signals, and multiplexing said electric signals to thereby form a first high-speed signal; and a first transmitting circuit for receiving the first high-speed signal from said first multiplexing circuit, generating first optical output data representative of an optical output power value output from said first multiplexer, inserting said first optical output data at a preselected position of said first high-speed signal, and transforming said first high-speed signal with said first output power data to a first high-speed optical signal having a first wavelength;

said second multiplexer comprising:

a second multiplexing circuit for transforming a plurality of preselected low-speed optical signals input thereto to corresponding electric signals, and multiplexing said electric signals to thereby form a second high-speed signal; and a second transmitting circuit for receiving the second high-speed signal from said second multiplexing circuit, generating second optical output data representative of an optical output power value output from said second multiplexer, inserting said second optical output data at a preselected position of said second high-speed signal, and transforming said second high-speed signal with said second output power data to a second high-speed optical signal having a second wavelength;

said first optical wavelength multiplexer comprising:

a first optical level control circuit for measuring a difference in level between the first optical output data and the second optical output data respectively received from said first transmitting circuit and said second transmitting circuit, and generating a first and a second control signal based on said difference;

a first optical variable attenuator for variably attenuating the first high-seed signal received from said first transmitting circuit in accordance with the first control signal received from said first optical level control circuit;

a second optical variable attenuator for variably attenuating the second high-seed signal received from said second transmitting circuit in accordance with the second control signal received from said first optical level control circuit;

a first wavelength multiplexing circuit for multiplexing said first high-speed optical signal and said second high-speed optical signal respectively output from said first optical variable attenuator and said second optical variable attenuator with respect to wavelength; and a first control light amplifying circuit for amplifying a high-speed optical signal output from said first wavelength multiplexing circuit with an exciting optical signal whose intensity is determined by a third control signal.

10. A device in accordance with claim 9, wherein said first transmitting circuit comprises:

a first optical output level generating circuit for generating an electric signal level corresponding to the optical output power value output from said first multiplexer; and a first optical output level byte generating circuit for transforming the electric signal level to corresponding first optical output data in the form of either one of a decimal number and a binary number;

said first transmitting circuit outputting and inserting the first optical output data;

said second transmitting circuit comprising:

a second optical output level generating circuit for generating an electric signal level corresponding to the optical output power value output from said second multiplexer; and a second optical output level byte generating circuit for transforming the electric signal level to corresponding second optical output data in the form of either one of a decimal number and a binary number;

said second transmitting circuit outputting and inserting the second optical output data.

11. A device in accordance with claim 9, wherein said first optical level control circuit comprises:

a first optical output level byte detecting circuit for receiving and then outputting the first optical output data and the second optical output data respectively received from said first transmitting circuit and said second transmitting circuit; and a first optical output detecting circuit for measuring a difference between the first optical output data and the second optical output data output from said first optical output level byte detecting circuit, and generating the first control signal and the second control signal based on said difference.

12. A device in accordance with claim 11, wherein said optical transmission system further includes a first network administration unit for receiving the first optical output data and the second optical output data input to or output from said first optical output level byte detecting circuit.

13. A device in accordance with claim 9, wherein a receiving station included in said optical transmission stem includes at least a third and a fourth multiplexer and a second optical wavelength multiplexer, said second optical wavelength multiplexer comprising:

a second optical level control circuit for measuring a difference in level between the first optical output data and the second optical output data separated, and generating a fourth and a fifth control signal based on said difference;

a first optical demultiplexing circuit for demultiplexing the high-speed optical signal input from said first control light amplifying circuit into high-speed optical signals respectively corresponding to said first wavelength data and said second wavelength data;

a third optical variable attenuator for variably attenuating the level of the first high-speed optical signal received from said first optical demultiplexing circuit in accordance with the fourth control signal received from said second optical level control circuit;

a fourth optical variable attenuator for variably attenuating the level of the second high-speed optical signal received from said first optical demultiplexing circuit in accordance with the fifth control signal received from said second optical level control circuit;

a second wavelength multiplexing circuit for multiplexing the first high-speed optical signal and the second high-speed optical signal respectively received from said third optical variable attenuator and said fourth optical variable attenuator with respect to wavelength;

a second control light amplifying circuit for amplifying the high-speed optical signal received from said second waveform multiplexing circuit with an exciting optical signal whose intensity is determined by a sixth control signal; and a second optical demultiplexing circuit for demultiplexing the high-speed optical signal input from said second control light amplifying circuit into high-speed optical signals respectively corresponding to said first wavelength data and said second wavelength data;

said third multiplexer comprising a first receiving circuit for receiving a high-speed optical signal corresponding to the first wavelength data output from said second optical demultiplexing circuit, transforming said high-speed optical signal to a corresponding electric signal, separating the first optical output data from said electric signal, and feeding said first optical output data to said second optical level control circuit;

said fourth multiplexer comprising a second receiving circuit for receiving a high-speed optical signal corresponding to the second wavelength data output from said second optical demultiplexing circuit, transforming said high-speed optical signal to a corresponding electric signal, separating the second optical output data from said electric signal, and feeding said second optical output data to said second optical level control circuit.

14. A device in accordance with claim 12, wherein a receiving station included in said optical transmission system includes at least a third and a fourth multiplexer and a second optical wavelength multiplexer, said second optical wavelength multiplexer comprising:

a second optical level control circuit for measuring a difference in level between the first optical output data and the second optical output data separated, and generating a fourth and a fifth control signal based on said difference;

a first optical demultiplexing circuit for demultiplexing the high-speed optical signal input from said first control light amplifying circuit into high-speed optical signals respectively corresponding to said first wavelength data and said second wavelength data;

a third optical variable attenuator for variably attenuating the level of the first high-speed optical signal received from said first optical demultiplexing circuit in accordance with the fourth control signal received from said second optical level control circuit;

a fourth optical variable attenuator for variably attenuating the level of the second high-speed optical signal received from said first optical demultiplexing circuit in accordance with the fifth control signal received from said second optical level control circuit;

a second wavelength multiplexing circuit for multiplexing the first high-speed optical signal and the second high-speed optical signal respectively received from said third optical variable attenuator and said fourth optical variable attenuator with respect to wavelength;

a second control light amplifying circuit for amplifying the high-speed optical signal received from said second waveform multiplexing circuit with an exciting optical signal whose intensity is determined by a sixth control signal; and a second optical demultiplexing circuit for demultiplexing the high-speed optical signal input from said second control light amplifying circuit into high-speed optical signals respectively corresponding to said first wavelength data and said second wavelength data;

said third multiplexer comprising a first receiving circuit for receiving a high-speed optical signal corresponding to the first wavelength data output from said second optical demultiplexing circuit, transforming said high-speed optical signal to a corresponding electric signal, separating the first optical output data from said electric signal, and feeding said first optical output data to said second optical level control circuit;

said fourth multiplexer comprising a second receiving circuit for receiving a high-speed optical signal corresponding to the second wavelength data output from said second optical demultiplexing circuit, transforming said high-speed optical signal to a corresponding electric signal, separating the second optical output data from said electric signal, and feeding said second optical output data to said second optical level control circuit.

15. A device in accordance with claim 13, wherein said second optical level control circuit comprises:

a second optical output level byte detecting circuit for receiving and then outputting the first optical output data and the second optical output data respectively received from said first receiving circuit and said second receiving circuit; and a second optical output detecting circuit for measuring a difference between the first optical output data and the second optical output data output from said second optical output level byte detecting circuit, and generating the fourth control signal and the fifth control signal based on said difference.

16. A device in accordance with claim 15, wherein said optical transmission system further includes second network administration unit for receiving the first optical output data and the second optical output data input to or output from said second optical output level byte detecting circuit.

17. In an optical output control device for an optical wavelength multiplexer included in an optical transmission system including at least a first and a second multiplexer and a first optical wavelength multiplexer situated at a transmitting station, said first multiplexer comprising:

a first multiplexing circuit for transforming a plurality of preselected low-speed optical signals input thereto to corresponding electric signals, and multiplexing said electric signals to thereby output a first high-speed signal; and a first transmitting circuit for receiving the first high-speed signal from said first multiplexing circuit, generating first optical output data representative of an optical output power value output from said first multiplexer, inserting said first optical output data at a preselected position of said first high-speed signal, and transforming said first high-speed signal with said first output power data to a first high-speed optical signal having a first wavelength;

said second multiplexer comprising:
   a second multiplexing circuit for transforming a plurality of preselected low-speed optical signals input thereto to corresponding electric signals, and multiplexing said electric signals to thereby output a second high-speed signal; and
   a second transmitting circuit for receiving the second high-speed signal from said second multiplexing circuit, generating second optical output data representative of an optical output power value output from said second multiplexer, inserting said second optical output data at a preselected position of said second high-speed signal, and transforming said second high-speed signal with said second output power data to a second high-speed optical signal having a second wavelength;

said first optical wavelength multiplexer comprising:
   a first optical level control circuit for measuring a difference in level between the first optical output data and the second optical output data respectively received from said first transmitting circuit and said second transmitting circuit, and generating a first and a second control signal based on said difference;
   a first wavelength multiplexing circuit for multiplexing the first high-speed optical signal and the second high-speed optical signal respectively received from said first transmitting circuit and said second transmitting circuit with respect to wavelength;
   a first control light amplifying circuit for amplifying a high-speed optical signal received from said first wavelength multiplexing circuit with an exciting optical signal whose intensity is determined by a third control signal;
   a first optical demultiplexing circuit for demultiplexing a high-speed optical signal output from said first control light amplifying circuit into a first and a second high speed optical signal respectively corresponding to the first wavelength and the second wavelength;
   a first variable optical attenuator for variably attenuating the first high-speed optical signal output from said first optical demultiplexing circuit in accordance with the first control signal output from said first optical level control circuit;
   a second variable optical attenuator for variably attenuating the second high-speed optical signal output from said first optical demultiplexing circuit in accordance with the second control signal output from said first optical level control circuit; and
   a second wavelength multiplexing circuit for multiplexing the first high-speed signal and the second high-speed signal respectively output from said first optical variable attenuator and said second optical variable attenuator.

18. A device in accordance with claim 17, wherein a receiving station included in said optical transmission system includes at least a third and a fourth multiplexer and a second optical wavelength multiplexer, said second optical wavelength multiplexer comprising:
   a second optical level control circuit for measuring a difference in level between the first optical output data and the second optical output data separated, and generating a fourth and a fifth control signal based on said difference;
   a second control light amplifying circuit for amplifying the high-speed optical signal received from said second waveform multiplexing circuit with an exciting optical signal whose intensity is determined by a sixth control signal;
   a second optical demultiplexing circuit for demultiplexing a high-speed optical signal output from said second control light amplifying circuit into a first and a second high-speed signal respectively corresponding to the first wavelength and the second wavelength;
   a third optical variable attenuator for variably attenuating the level of the first high-speed optical signal received from said second optical demultiplexing circuit in accordance with the fourth control signal received from said second optical level control circuit; and
   a fourth optical variable attenuator for variably attenuating the level of the second high-speed optical signal received from said second optical demultiplexing circuit in accordance with the fifth control signal received from said second optical level control circuit;
   said third multiplexer comprising a first receiving circuit for receiving a high-speed optical signal corresponding to the first wavelength data output from said third optical variable attenuator, and transforming said high-speed optical signal to a corresponding electric signal, separating the first optical output data from said electric signal, and feeding said first optical output data to said second optical level control circuit;
   said fourth multiplexer comprising a second receiving circuit for receiving a high-speed optical signal corresponding to the second wavelength data output from said fourth optical variable attenuator, transforming said high-speed optical signal to a corresponding electric signal, separating the second optical output data from said electric signal, and feeding said second optical output data to said second optical level control circuit.

* * * * *